US007609694B2

(12) United States Patent
Moki et al.

(10) Patent No.: US 7,609,694 B2
(45) Date of Patent: Oct. 27, 2009

(54) MULTICAST COMMUNICATIONS SYSTEM WITH MECHANISM FOR UPDATING MULTICAST TREES

(75) Inventors: Masato Moki, Kawasaki (JP);
Takaharu Yoshimura, Kawasaki (JP);
Yuji Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 273 days.

(21) Appl. No.: 11/853,126

(22) Filed: Sep. 11, 2007

(65) Prior Publication Data
US 2008/0002693 A1 Jan. 3, 2008

Related U.S. Application Data

(63) Continuation of application No. PCT/JP2005/005517, filed on Mar. 25, 2005.

(51) Int. Cl.
*H04L 12/56* (2006.01)
(52) U.S. Cl. ...................................... 370/390; 370/432
(58) Field of Classification Search ................ 370/389, 370/390, 392, 432
See application file for complete search history.

(56) References Cited

U.S. PATENT DOCUMENTS

| 6,721,907 | B2 * | 4/2004 | Earl ............................. 714/57 |
| 7,035,217 | B1 * | 4/2006 | Vicisano et al. ............. 370/236 |
| 2005/0180447 | A1 * | 8/2005 | Lim et al. .................... 370/432 |
| 2005/0226144 | A1 * | 10/2005 | Okita ........................ 370/219 |

FOREIGN PATENT DOCUMENTS

| JP | 2001-177564 | 6/2001 |
| JP | 2003-258826 | 9/2003 |
| JP | 2004-214896 | 7/2004 |
| JP | 2004-297579 | 10/2004 |

OTHER PUBLICATIONS

International Search Report dated Jun. 14, 2005, from the corresponding International Application.
Partial Translation of the Written Opinion of the International Searching Authority dated Jun. 14, 2005.
C. Janneteau et al. "Comparison of Three Approaches Towards Mobile Multicast" IST Mobile Summit 2003, Portugal, Jun. 2003.

* cited by examiner

*Primary Examiner*—Jayanti K Patel
*Assistant Examiner*—Bo Hui A Zhu
(74) *Attorney, Agent, or Firm*—Katten Muchin Rosenman LLP

(57) ABSTRACT

A multicast communications system that updates multicast trees in a reliable way to prevent transmitted packets from being dropped or reversed before they reach their destinations. When a transmitting device sending multicast packets has moved from an initial access point to a new access point, a trigger data generator produces and sends trigger data to a network control server. This trigger data includes a sequence number of a particular packet as a trigger condition that initiates a change from an initial multicast tree to a new multicast tree. A trigger data distributor then sends the trigger data to both the initial and new access points. In packet routing devices, an update processor maintains the initial multicast tree until a packet having the sequence number specified in the trigger data is received and forwarded. After that, the update processor replaces the initial multicast tree with the new multicast tree.

25 Claims, 24 Drawing Sheets

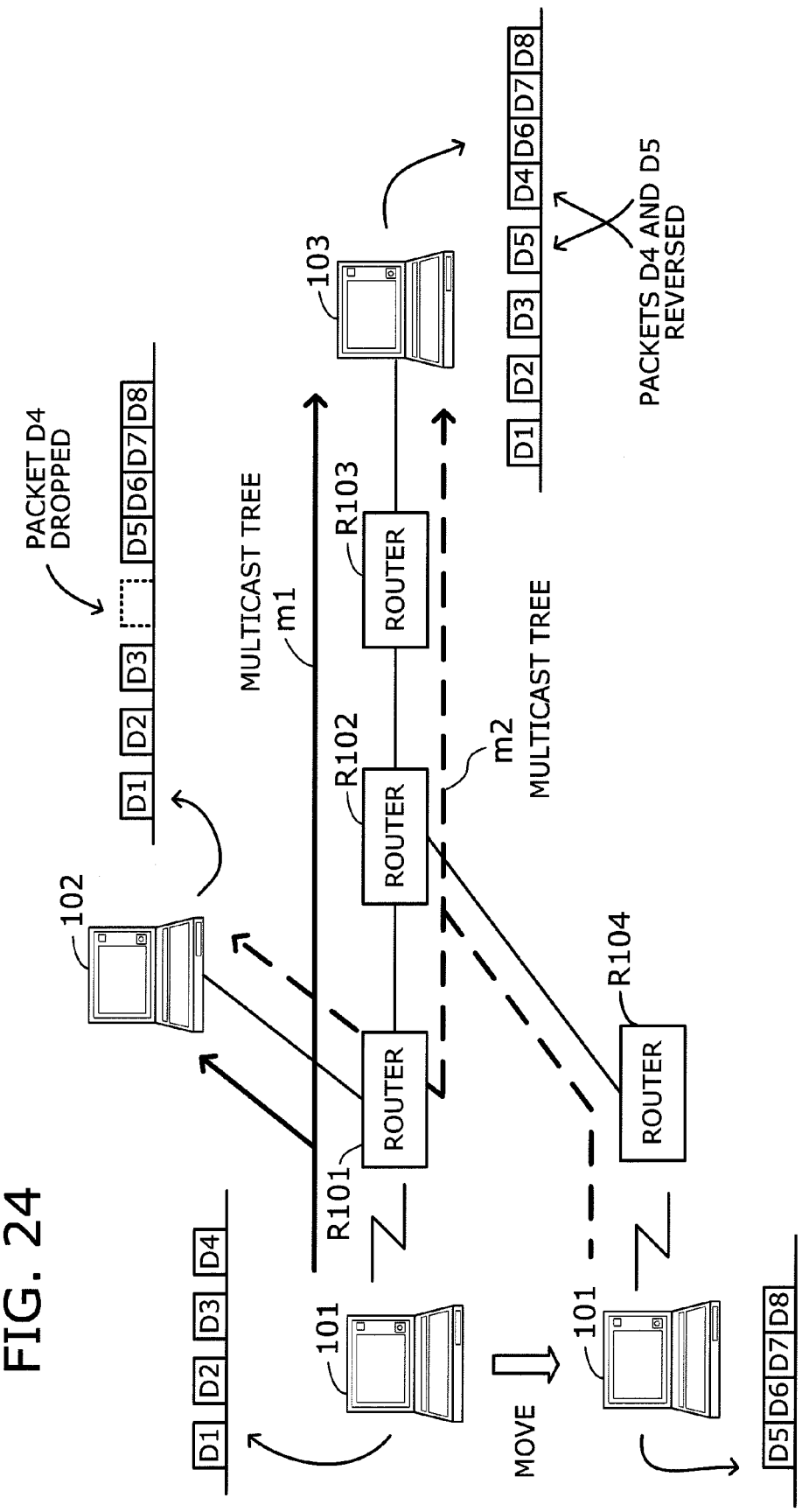

MULTICAST COMMUNICATIONS SYSTEM WITH MECHANISM FOR UPDATING MULTICAST TREES

This application is a continuing application, filed under 35 U.S.C. §111(a), of International Application PCT/JP2005/005517, filed Mar. 25, 2005.

BACKGROUND OF THE INVENTION

1. Field of the Invention

The present invention relates to multicast communications systems, and more particularly to a multicast communications system that distributes packets to multiple destinations through a multicast tree.

2. Description of the Related Art

Multicast communication techniques are widely used in recent years to distribute the same set of packets (e.g., video streams) to multiple specified destinations. The term "multicast" is used as opposed to other terms representing a specific communication mode, such as "unicast" which means sending packets from one node to another node or "broadcast" which means sending packets to all connected receivers.

The users of video and other communication content desire high quality services even when they are moving. Network systems for cellular phones and portable notebook computers are required to provide not only mobility of users, but also high-quality multicast communications services.

FIG. 22 shows an example of multicast communication. The illustrated network 100 is formed from routers R101 to R104, a transmitting device 101, and terminal groups g1 and g2 each including a plurality of terminals. For simplicity purposes, let a single receiving terminal 102 represent one terminal group g1. Likewise, the other terminal group g2 will be represented by a single receiving terminal 103.

Three routers R101 to R103 are connected in line, and another router R104 is linked to router R102. One receiving terminal 102 is attached to router R101 via a radio link, while another receiving terminal 103 is wired to router R103.

The two receiving terminals 102 and 103 send an entry request to their corresponding routers R101 and R103 to subscribe to a multicast service. In this example, multicast packets transmitted from the transmitting device 101 are supposed to flow over two routes provided by a multicast tree m1. One route goes from the transmitting device 101, then to router R101, and reaches one receiving terminal 102. The other route goes from the transmitting device 101, then to router R101, router R102, router R103, and reaches another receiving terminal 103.

FIG. 23 shows another example of multicast communication. It is assumed that the transmitting device 101 has left its original router R101 and is now attached to a different router R104. The resulting network 100a offers a new multicast tree m2 to deliver multicast packets from the transmitting device 101 to the receiving terminals 102 and 103 through two routes. That is, one route goes from the transmitting device 101, then to router R104, router R102, router R101, and reaches one receiving terminal 102. The other route goes from the transmitting device 101, then to router R104, router R102, router R103, and reaches another receiving terminal 103.

The network supports the Internet Group Management Protocol (IGMP) to allow terminals to use a multicast service in the way described above. A multicast tree can be established by using the techniques known as the Protocol Independent Multicast Dense Mode (PIM-DM), PIM-Sparse Mode (PIM-SM), and Source Specific Multicast (SSM). Another tree building method is available as part of RFC3032, the Multi Protocol Label Switching Architecture (MPLS), which permits a source device or routing device to initiate a process to create a multicast tree.

According to one proposed technique for multicast communication, when an entry request for joining a multicast group arrives at a certain routing device, that routing device asks its adjacent routing devices to update their routing tables to build a multicast tree (see, for example, Japanese Patent Application Publication No. 2004-297579, paragraph Nos. 0044 to 0049, FIG. 1). This proposed technique, however, may reduce operability and reliability of the network system since, in the case where movement of terminal stations causes a change in the multicast tree, some transmitted packets might arrive at their destinations in an incorrect sequence or could even be dropped somewhere on the way.

FIG. 24 shows the drawback of a conventional system mentioned above. It is assumed here that the transmitting device 101 is moving from one router R101 to another router R104 while multicasting a series of packets D1, D2, D3, ... D8 in that order to receiving terminals 102 and 103. It is also assumed that router R101 has some delay of buffering when it sends packets. When the multicast tree changes its form from m1 to m2, routers R101 to R104 updates their respective internal multicast tables with new routing information. More specifically, those routers R101 to R104 overwrite their table t1 describing the initial multicast tree m1 with a new table t2 describing a new multicast tree m2.

Suppose now that router R101 recognizes an event that necessitates a change in the current multicast tree m1 before forwarding the first four packets D1 to D4 completely. One possible scenario in this situation is that router R101 changes its multicast table from t1 to t2 right after the third packet D3 is sent out to the multicast tree m1. According to the new multicast table t2 for multicast tree m2, router R101 reconfigures itself such that every incoming packet from router R102 to the receiving terminal 102. Since the previous routing information describing the initial multicast tree m1 has been erased, router R101 is unable to decide where to forward a subsequent packet D4. As a result, the receiving terminal 102 cannot receive that packet D4; that is, a packet drop occurs.

Another possible scenario in the above situation may be as follows: Router R101 sends out a packet D4 to initial multicast tree m1, while router R102 changes its multicast table from t1 to t2 to adapt itself to a new multicast tree. Router R104, on the other hand, forwards a packet D5 to router R102. In this situation, packet D5 may happen to arrive earlier than packet D4 at router R102, and as a result, router R102 forwards packet D5 and then packet D4 toward the receiving terminal 103. This means that the receiving terminal 103 receives these packets in a reverse order.

As can be seen from the above examples, the conventional multicast network is unable to handle changes in the multicast tree structure properly, causing inconsistent control of multicast data traffic in different routers. The resulting packet drop or reversed sequence of packets would disrupt reception of multicast data at many terminal.

SUMMARY OF THE INVENTION

In view of the foregoing, it is an object of the present invention to provide a multicast communications system that updates multicast trees in a more reliable and operable way to prevent transmitted packets from being dropped or reaching their destination in reverse order.

To accomplish the above object, the present invention provides a multicast communications system for multicasting packets through a multicast tree on a network. This multicast communications system includes a transmitting device, a network control server, and first to third packet routing devices. The transmitting device can move from a first access point to a second access point in the network. The transmitting device has a multicast transmitter that transmits packets while adding a sequence number to each packet to be multicast. The transmitting device also has a trigger data generator that produces trigger data and sends the trigger data together with a location registration request when the transmitting device has moved during a multicast session. The trigger data specifies a trigger condition that initiates a change from an initial multicast tree to a new multicast tree. Specifically, the trigger data includes the sequence number of a particular packet as a trigger condition. The network control server handles the location registration request from the transmitting device and manages the multicast tree, the network control server. The network control server has a trigger data distributor that receives the trigger data from the transmitting device and forwards the trigger data to the second access point where the transmitting device is visiting, as well as sending the trigger data in encapsulated form to the first access point to which the transmitting device has previously attached. The first packet routing device at the second access point includes a buffer that stores packets transmitted by the transmitting device during a period between reception of the trigger data and establishment of a new multicast tree. The buffer outputs the stored packets when the new multicast tree becomes ready. The second packet routing device at the first access point includes a decapsulator that decapsulates the encapsulated trigger data received and sends the decapsulated trigger data to the initial multicast tree. The third packet routing device, located on the initial multicast tree, has an update processor. The update processor finds the sequence number specified in the trigger data, maintains the initial multicast tree until a packet having the specified sequence number is received and forwarded, and replaces the initial multicast tree with the new multicast tree afterwards.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 24 shows drawbacks of conventional systems.

DESCRIPTION OF THE PREFERRED EMBODIMENTS

Figure 1:
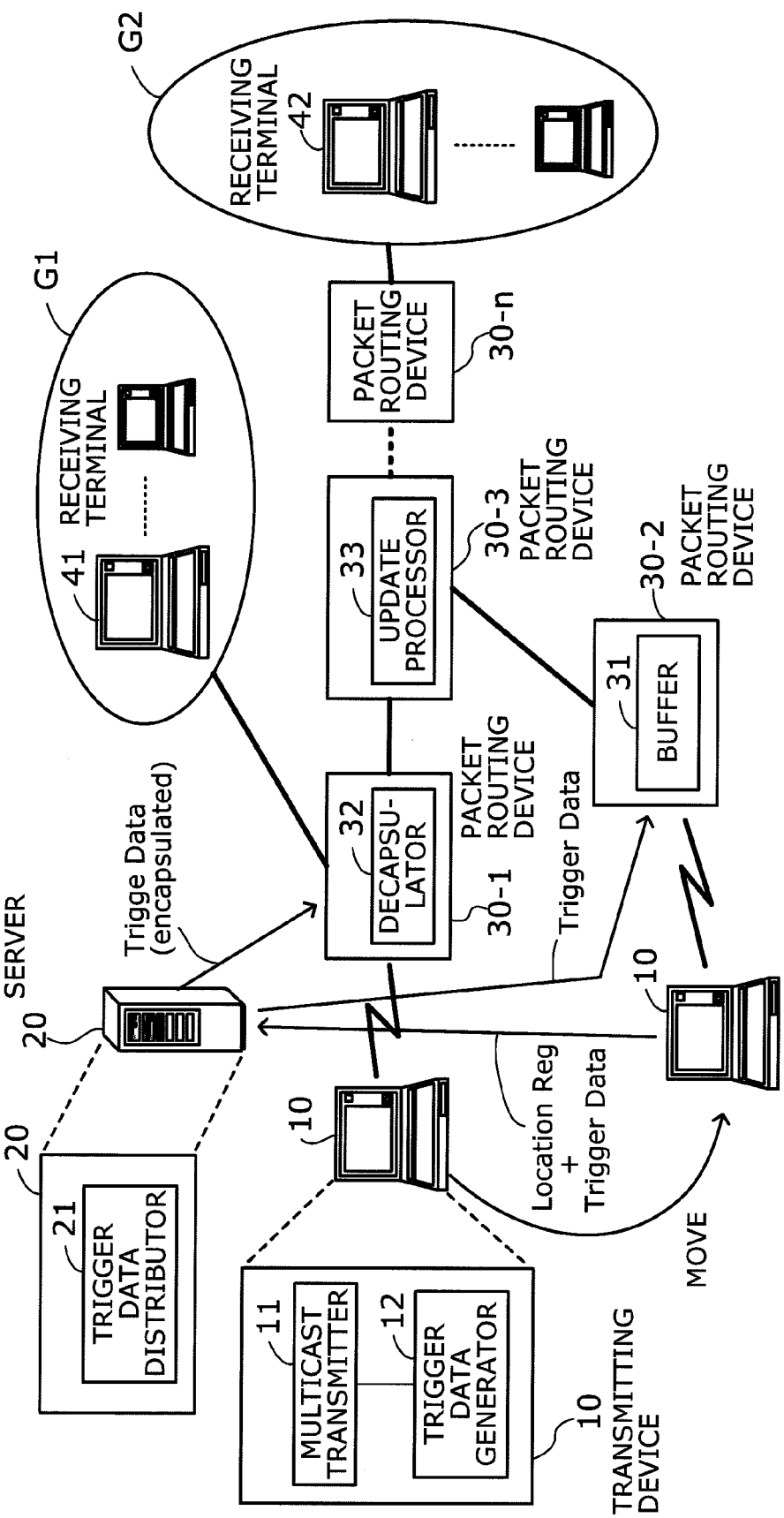
FIG. 1 is a block diagram of a multicast communications system according to an embodiment of the present invention.

Preferred embodiments of the present invention will be described below with reference to the accompanying drawings, wherein like reference numerals refer to like elements throughout.

FIG. 1 is a block diagram of a multicast communications system according to a first embodiment of the present invention. This multicast communications system 1 includes a transmitting device 10, a network control server 20, packet routing device 30-1 to 30-n (collectively referred to by the reference numeral "30"), and two groups, G1 and G2, of terminals including receiving terminals 41 and 42. The multicast communications system 1 enables packets to be delivered to multiple destinations over multicast routes defined as a multicast tree.

Packet routing devices 30-1 and 30-3 to 30-n are linked in series. The packet routing device 30-3 extends a branch to another packet routing device 30-2. A transmitting device 10 attaches to the packet routing device 30-1 via a radio link. Also attaching to the packet routing device 30-1 are a plurality of terminals belonging to terminal group G1. Terminals of another group G2 attach to the packet routing device 30-n. The transmitting device 10 has mobility and can attach to the packet routing device 30-2 through a radio link when it visits there.

The transmitting device 10 is a mobile station whose location has been registered with the network control server 20. While roaming within the network, the transmitting device 10 multicasts packets to two or more terminals of the terminal groups G1 and G2. (For simplicity purposes, let two receiving terminals 41 and 42 represent the two terminal groups g1 and g2, respectively.) Although the transmitting device 10 is attached initially to the packet routing device 30-1, it is assumed that the transmitting device 10 moves to the coverage area of another packet routing device 30-2 while continuing multicast transmission.

The transmitting device 10 includes a multicast transmitter 11 and a trigger data generator 12. The multicast transmitter 11 transmits packets while adding a sequence number to each packet to be multicast. The trigger data generator 12 produces trigger data when the transmitting device 10 has moved from one access point to another access point during a multicast session. The trigger data is a piece of information specifying a trigger condition that initiates a change from an initial multicast tree to a new multicast tree. The trigger data generator 12 sends such trigger data to the network control server 20 managing the network.

The trigger data actually includes, as a trigger condition, the sequence number of a last-sent multicast packet. Suppose, for example, that the transmitting device 10 has sent packets #1 to #4 out of eight packets to the packet routing device 30-1 which has served as an initial access point of the transmitting device 10. In this case, the trigger data carries the sequence number "4" of the last-sent packet.

The network control server 20 handles location registration of the transmitting device 10 and other mobile stations (not shown), as well as managing the multicast trees. The network control server 20 includes a trigger data distributor 21 that receives trigger data from the transmitting device 10 and forwards it to a new access point (packet routing device 30-2 in the system shown in FIG. 1) the transmitting device 10 is visiting. The trigger data distributor 21 also sends the received trigger data in encapsulated form to the previous access point (packet routing device 30-1 in FIG. 1) to which the transmitting device 10 have been attached. The term "access point" used in this description refers to an access router or other network access equipment. More specifically, the access point may be a router itself, or alternatively a separate device coupled to a router that originates multicast traffic.

Each packet routing device 30-1 to 30-n includes a buffer 31, a decapsulator 32, and an update processor 33. In the packet routing device 30-2 at a new access point of the transmitting device 10, its buffer 31 stores packets transmitted by the transmitting device 10 during the period between reception of trigger data and establishment of a new multicast tree. The buffer 31 outputs those pending packets when the new multicast tree becomes ready.

In the packet routing device 30-1 at the initial access point of the transmitting device 10, the decapsulator 32 decapsulates encapsulated trigger data that is received via the network control server 20. The decapsulator 32c sends the decapsulated trigger data to other routing devices on the initial multicast tree.

The packet routing devices other than the packet routing devices 30-1 and 30-2 forward packets from their peer devices. In those packet routing devices on the initial multicast tree, the update processor 33 finds a sequence number specified in received trigger data and maintains the initial multicast tree until a packet having the specified sequence number is received and forwarded. Afterwards, the update processor 33 replaces the initial multicast tree with the new multicast tree. That is, the update processor 33 keeps selecting the initial multicast tree, not updating it with a new route, until a packet having the specified sequence number comes and goes. The above applies not only to the routing device to which the transmitting device attaches directly, but also to other routing devices forming a multicast tree.

First Embodiment

Figure 2:
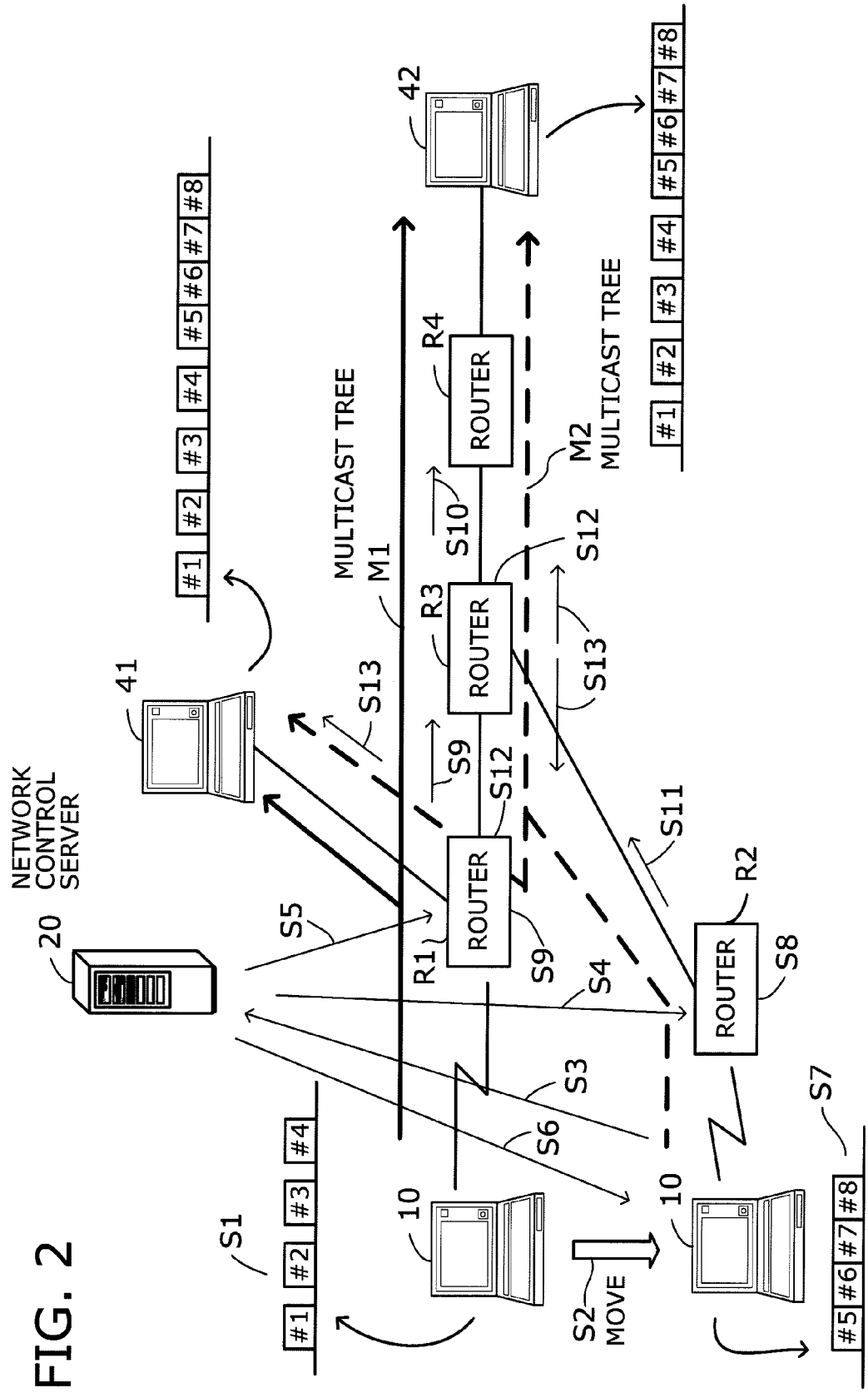
FIG. 2 shows how the proposed multicast communications system operates.
Figure 3:
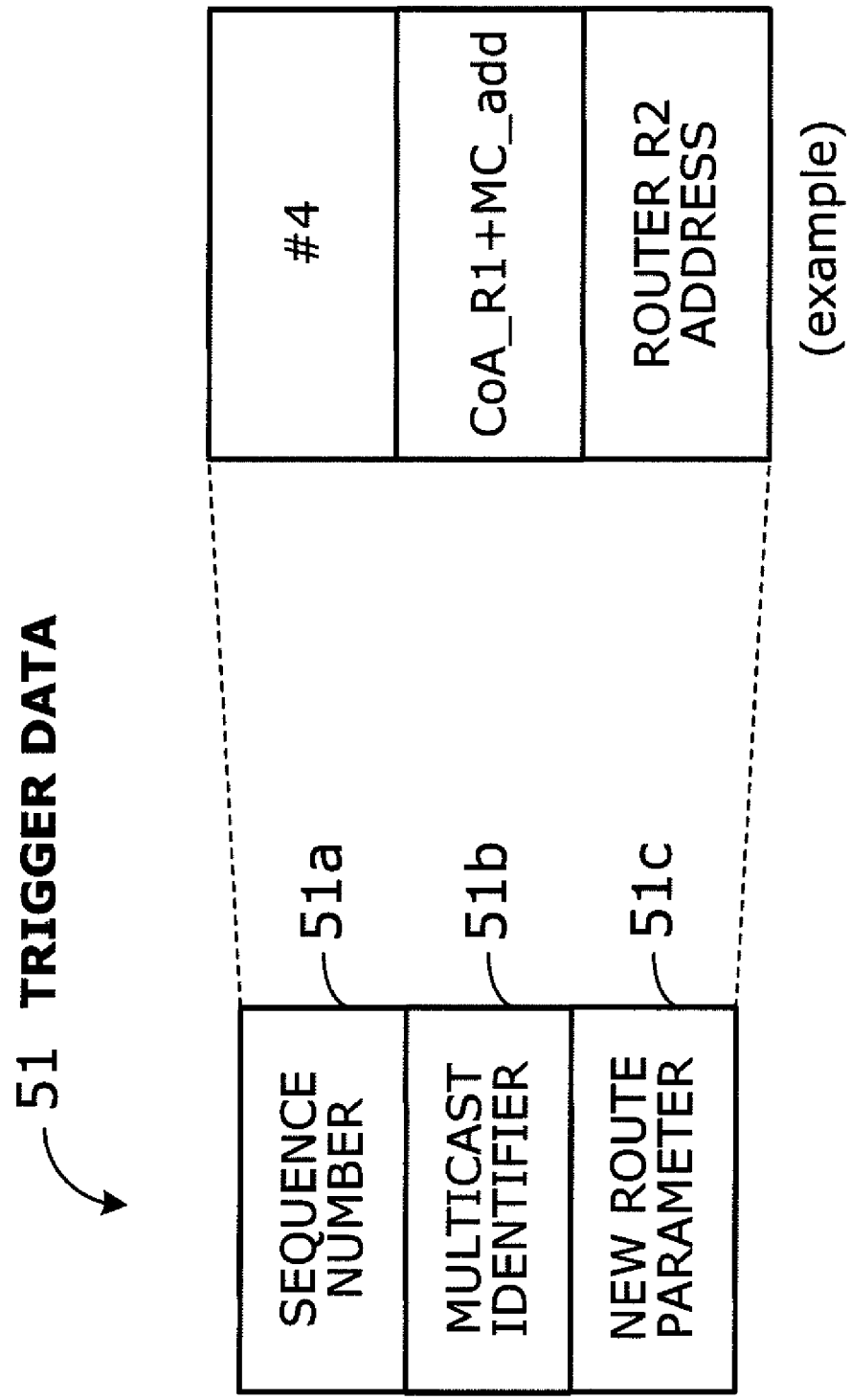
FIG. 3 shows the structure of trigger data.
Figure 4:
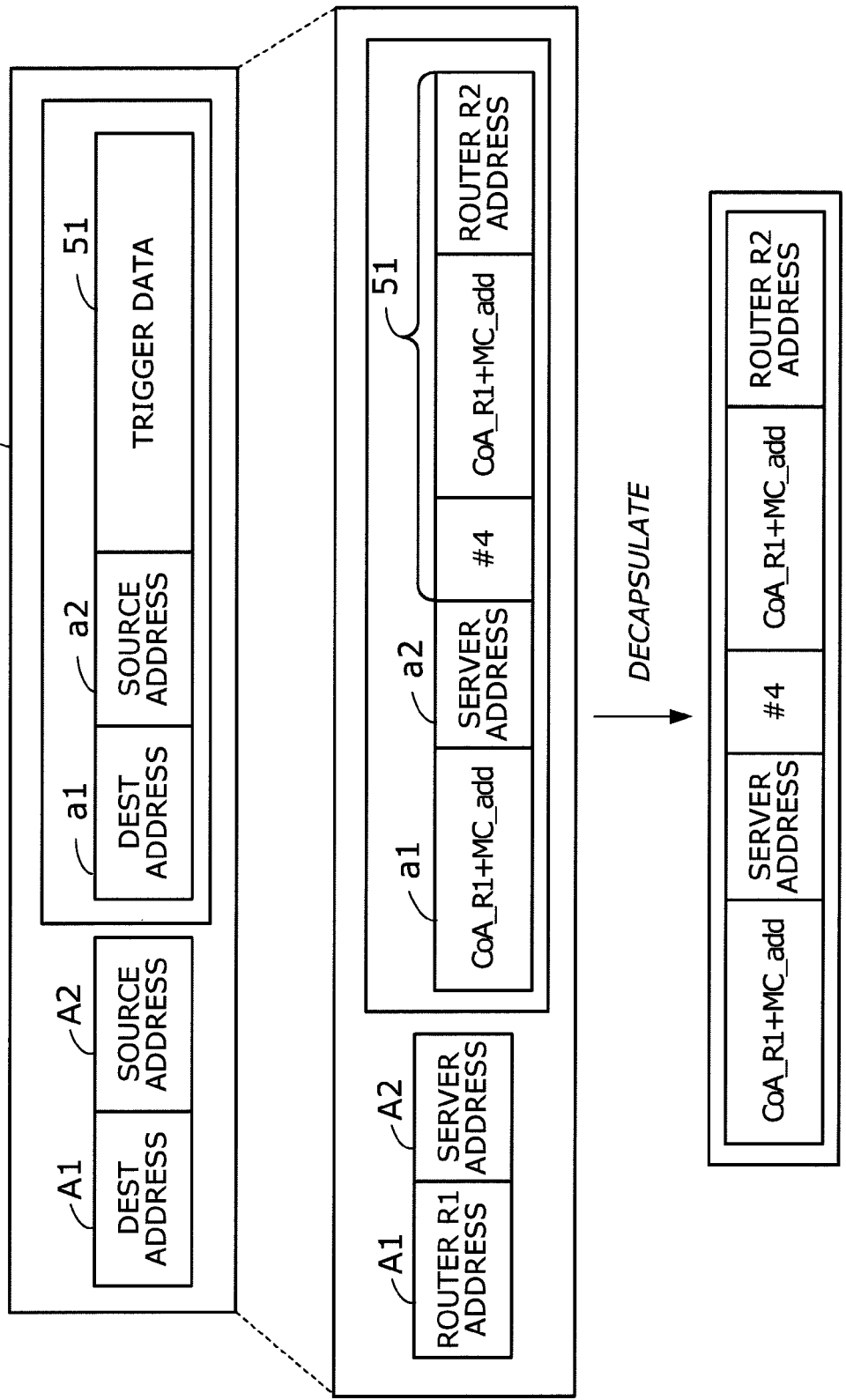
FIG. 4 shows the structure of encapsulated trigger data.

Referring now to FIGS. 2 to 4, this section describes how the first embodiment operates. FIG. 2 shows the operation of the multicast communications system of FIG. 1. Note that what have been referred to as the packet routing devices 30-1 to 30-n in FIG. 1 will be called "routers" R1 to Rn in this section.

Suppose now that the transmitting device 10 attaches to a router R1. Receiving terminals 41 and 42 send an entry request for multicast service to their nearest routers R1 and R4, respectively. The transmitting device 10 is supposed to send packets over a multicast tree M1 which goes from the transmitting device 10, then to router R1, router R3, router R4 and reaches one receiving terminal 42, with a branch from router R1 to another receiving terminal 41.

(S1) The transmitting device 10 sends multicast packets to router R1 to which it attaches. Those packets have their respective sequence numbers #1 to #4.

(S2) After sending those multicast packets #1 to #4, the transmitting device 10 leaves router R1 and moves to another router R2.

(S3) The transmitting device 10 registers its location with the network control server 20. This process includes transmission of trigger data from the transmitting device 10 to the network control server 20.

FIG. 3 shows the structure of trigger data. This trigger data 51 is formed from a sequence number 51a, a multicast identifier 51b, and a new route parameter 51c. The sequence number 51a designates a particular packet. The multicast identifier 51b is formed from a care-of address (CoA) and a multicast address (MC address). CoA is temporarily used in a network segment where a mobile device is visiting. The new route parameter 51c carries the address of a new router to which the mobile device attaches.

In the present example, the sequence number 51a has a value of #4; the multicast identifier 51b is CoA_R1+MC_add; and the new route parameter 51c gives the address of router R2. Multicast identifier "CoA_R1+MC_add" means care-of address (CoA_R1) that the transmitting device 10 uses when it attaches to router R1, combined with a multicast address (MC_add). This multicast identifier is exactly what was used to build the multicast tree M1 when the transmitting device 10 attached to router R1. The sequence number 51a may be replaced with other parameters of multicast control data, as will be described later in FIG. 14.

(S4) The network control server 20 forwards the trigger data from the transmitting device 10 to router R2.

(S5) The network control server 20 encapsulates the trigger data received from the transmitting device 10 and forwards it to router R1. FIG. 4 shows the structure of encapsulated trigger data. In addition to the trigger data 51 produced at step S3, this encapsulated trigger data includes a destination address field a1 and a source address field a2 to carry address information. More specifically, the destination address field a1 contains the multicast identifier of the transmitting device 10, and the source address field a2 contains the address of the network control server 20. The network control server 20 then encapsulates those pieces of information, with a destination address field A1 and a source address field A2. In the present example, the destination address field A1 contains the address of router R1, and the source address field A2 contains the address of the network control server 20.

(S6) The network control server 20 returns acknowledgment of the location registration back to the transmitting device 10.

(S7) The transmitting device 10 sends out packets #5 to #8 to router R2.

(S8) Upon receipt of the trigger data, router R2 finds that the new route parameter contained in that data matches with the address of router R2 itself.

Router R2 keeps packet #5 and subsequent packets in a buffer until a new multicast tree becomes ready (or until an entry request comes from some other router). In the present example, the pending packets remain in the buffer until router R2 receives an entry request from its subordinate router R3 ("subordinate" means "immediately below" in the multicast tree hierarchy).

(S9) Upon receipt of the encapsulated trigger data, router R1 decapsulates it (i.e., removes encapsulation header information) and forwards the content (i.e., original trigger data before encapsulation) to router R3.

(S10) Router R3 further sends the trigger data to router R4 since it bears a multicast destination address "CoA_R1+ MC_add." The forwarding operation of this kind permits all routers on the initial multicast tree M1 to receive the same trigger data.

(S11) Upon receipt of an entry request for multicast service from router R3, router R2 outputs the pending packets in its buffer to a new route defined by a multicast tree M2.

(S12) Some of the routers that have received trigger data have to modify their routing directions according to the new multicast tree M2. In the present example, routers R1 and R3 have to do it (whereas router R4 does not since both multicast trees M1 and M2 run through the same ports of router R4). Such routers, however, do not make haste to implement the change from M1 to M2. Instead of updating their multicast tables immediately, those routers maintain the initial multicast tree M1 until they receive and forward packet #4. This means that, during this particular period, two multicast trees coexist in some part of the network.

(S13) Routers R1 and R3 may receive a packet from the new multicast tree M2 while the initial multicast tree M1 is still maintained. If this is the case, routers R1 and R3 hold that packet in their respective buffers until they receive and forward packet #4. When packet #4 comes and goes, routers R1 and R3 update their multicast tree from M1 to M2, thus permitting the packet in the buffer to find its way to the multicast tree M2.

Accordingly, the multicast packets transmitted from the transmitting device 10 are delivered to their destinations according to the new multicast tree M2, which includes two routes: (a) transmitting device 10 -->router R2 -->router R3 -->router R1 -->receiving terminal 41; and (b) transmitting device 10 -->router R2 -->router R3 -->router R4 -->receiving terminal 42.

The above-described control eliminates discrepancies between routers when they update multicast trees. The proposed system prevents transmitted packets from being dropped or reversed before they reach the receiving terminals 41 and 42, thus maintaining the quality of multicast service.

Second Embodiment

Figure 5:
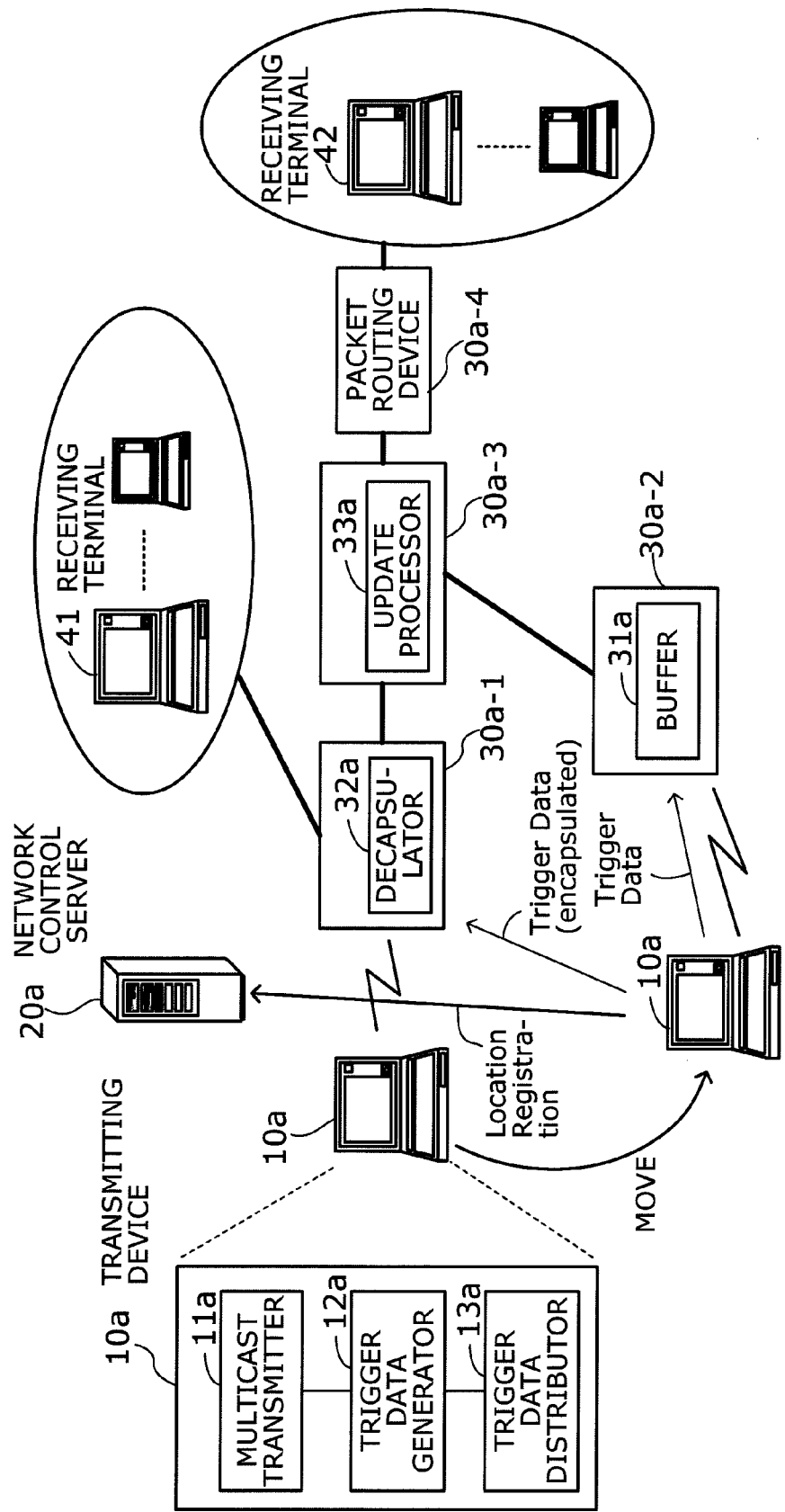
FIG. 5 shows the structure of a multicast communications system according to a second embodiment of the present invention.

Referring to FIG. 5, this section describes a multicast communications system according to a second embodiment of the present invention. The illustrated multicast communications system 1a is formed from a transmitting device 10a, a network control server 20a, packet routing devices (or routers) 30a-1 to 30a-4, and receiving terminals 41 and 42.

In the first embodiment, the network control server 20 interacts with routers R1 and R2 to control distribution of trigger data. The second embodiment modifies the system such that the transmitting device 10a will take that part of the network control server 20. Accordingly, the trigger data distributor 21 (see FIG. 1) in the network control server 20 will be integrated into the transmitting device 10a as a trigger data distributor 13a in the second embodiment. Other elements of the system are similar to or the same as those of the first embodiment.

In the first embodiment, the network control server 20 needs to know the details of multicast routes to determine to which routers it should send commands. Specifically, in the system shown in FIG. 1, the network control server 20 interacts with a packet routing device 30a-1 on the initial multicast tree, as well as with a packet routing device 30a-2 on the new multicast tree. Unlike the first embodiment, the second embodiment does not rely on its network control server 20a to distribute trigger data over the network.

The second embodiment operates as follows. After moving to another area, the transmitting device 10a registers its location with the network control server 20a, sending trigger data to the packet routing device 30a-2. The transmitting device 10a also sends an encapsulated version of the trigger data to another packet routing device 30a-1 via the packet routing device 30a-2. The packet routing devices 30a then operate in the same way as described in FIG. 2, and the explanation will not be repeated here.

Third Embodiment

This section describes a multicast communications system according to a third embodiment of the present invention. The foregoing sections have explained first and second embodiments as solutions for the problem of communication failures caused by a change in multicast trees as a result of movement of terminal stations. Conventionally, however, the packets may drop or arrive in reverse order, not only due to a movement of terminal stations, but also due to reorganization of multicast trees that the network performs intentionally. The third embodiment of the invention is a solution for multicast communications that enables the network to modify its multicast trees without causing a communication failure.

Figure 6:
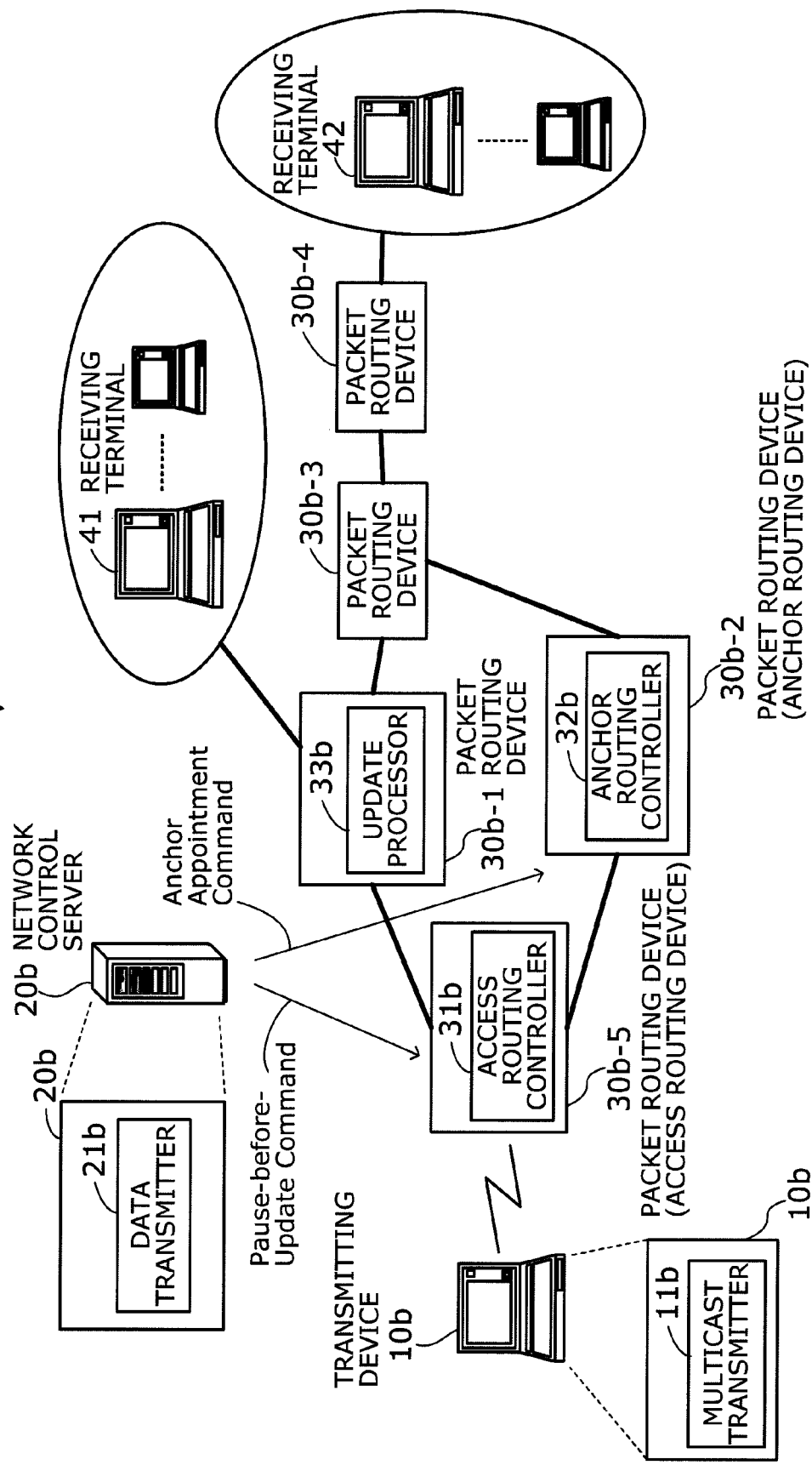
FIG. 6 shows the structure of a multicast communications system according to a third embodiment of the present invention.

FIG. 6 shows the structure of a multicast communications system according to the third embodiment of the present invention. This multicast communications system 1b is formed from a transmitting device 10b, a network control server 20b, packet routing devices 30b-1 to 30b-5 (collectively referred to by the reference numeral "30b"), and receiving terminals 41 and 42.

Packet routing devices 30b-5, 30b-1, 30b-3, and 30b-4 are linked in series. A packet routing device 30b-2 is linked to the packet routing devices 30b-5 and 30b-1. One receiving terminal 41 attaches to one packet routing device 30b-1 while another receiving terminal 42 attaches to another packet routing device 30b-4. The transmitting device 10b attaches to the packet routing device 30b-5 as a non-mobile station.

In the multicast communications system 1b, the packet routing device 30b-5 serves as an "access routing device" since it permits the transmitting device 10b to have access to the network. The packet routing device 30b-2 will serve as an "anchor routing device" when a new multicast tree is applied to the network.

The transmitting device 10b includes a multicast transmitter 11b. The multicast transmitter 11b transmits multicast packets with sequence numbers representing the order in which they are transmitted.

The network control server 20b includes a command transmitter 21b. When updating a multicast tree on the network, the command transmitter 21b sends trigger data including a pause-before-update command to the access routing device 30b-5 to which the transmitting device 10b attaches. The pause-before-update command asks the access routing device 30b-5 to update its multicast tree not immediately, but after making a pause for right timing. The access routing device 30b-5 distributes this information to other routing devices 30b-1 and 30b-3, and 30b-4 through the current multicast route.

When a new multicast tree is activated, the access routing device 30b-5 will forward packets first to its neighboring routing device 30b-2. This routing device 30b-2 is thus referred to as an anchor routing device. Before switching routes from the initial multicast tree to the new one, the network control server 20b sends an anchor appointment command to the forwarding routing device 20b-2 to indicate that it will receive packets which is supposed to be forwarded through the new multicast tree.

The packet routing device 30b includes an access routing controller 31b, an anchor routing controller 32b, and an update processor 33b. The access routing controller 31b serves in an access routing device 30b-5. Upon receipt of trigger data including a pause-before-update command, the access routing controller 31b sends it to other routing devices on the initial multicast tree. The access routing controller 31b also produces trigger data containing, not a pause-before-update command, but an update sequence number, so as to request those routing devices on the initial multicast tree to update their multicast tree. Yet another function of the access routing controller 31b is to buffer packets sent from the transmitting device 10b until a multicast service entry request is received from the anchor routing device 30b-2. Upon receipt of an entry request, the access routing controller 31b outputs the pending packets in its buffer to the anchor routing device 30b-2, the first hop destination on the new multicast tree.

The anchor routing controller 32b serves in a anchor routing device 30b-2. Upon receipt of anchor appointment command, the anchor routing controller 32b determines whether it is the first hop destination of the new multicast tree. If it is, the anchor routing controller 32b waits for an entry request from a subordinate routing device. Upon receipt of an entry request, the anchor routing controller 32b forwards it to the access routing device 30b-5. Further, when the new multicast tree is established, the anchor routing controller 32b forwards packets from the access routing device 30b-5 to the new multicast tree.

The update processor 33b serves in other packet routing devices 30b that forward packets from peer routing devices. In the system of FIG. 6, the packet routing devices 30b-1, 30b-3, and 30b-4 are among this group. Upon receipt of trigger data including a pause-before-update command, the update processor 33b sends an entry request to a neighboring device without updating its multicast tree for the time being. Upon receipt of subsequent trigger data, the update processor 33b finds a sequence number specified in the received trigger data. The update processor 33b keeps the current multicast tree, without updating it to new one, until it receives a packet with the specified sequence number.

Figure 7:
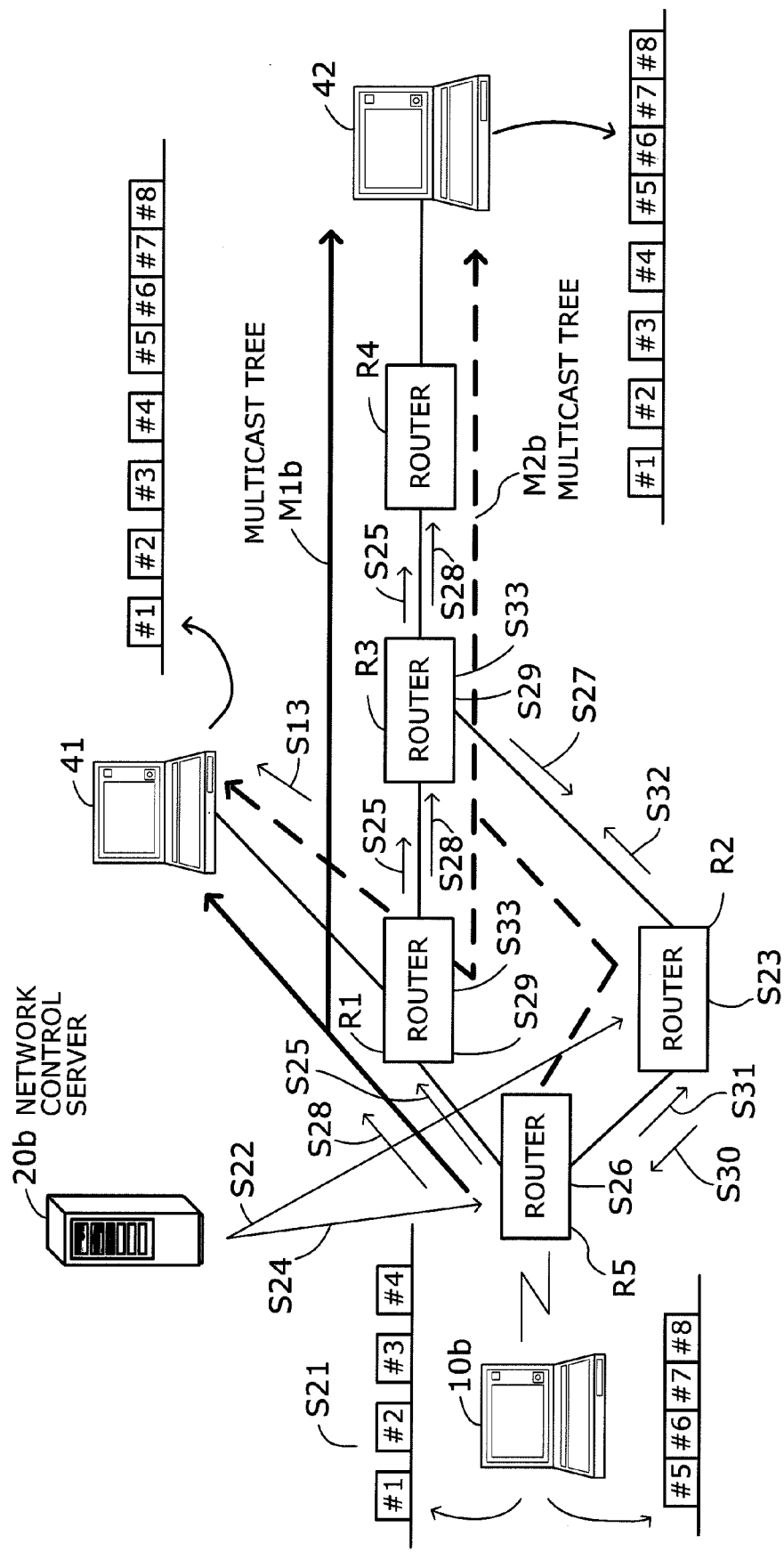
FIG. 7 shows how the multicast communications system of FIG. 6 operates.
Figure 8:
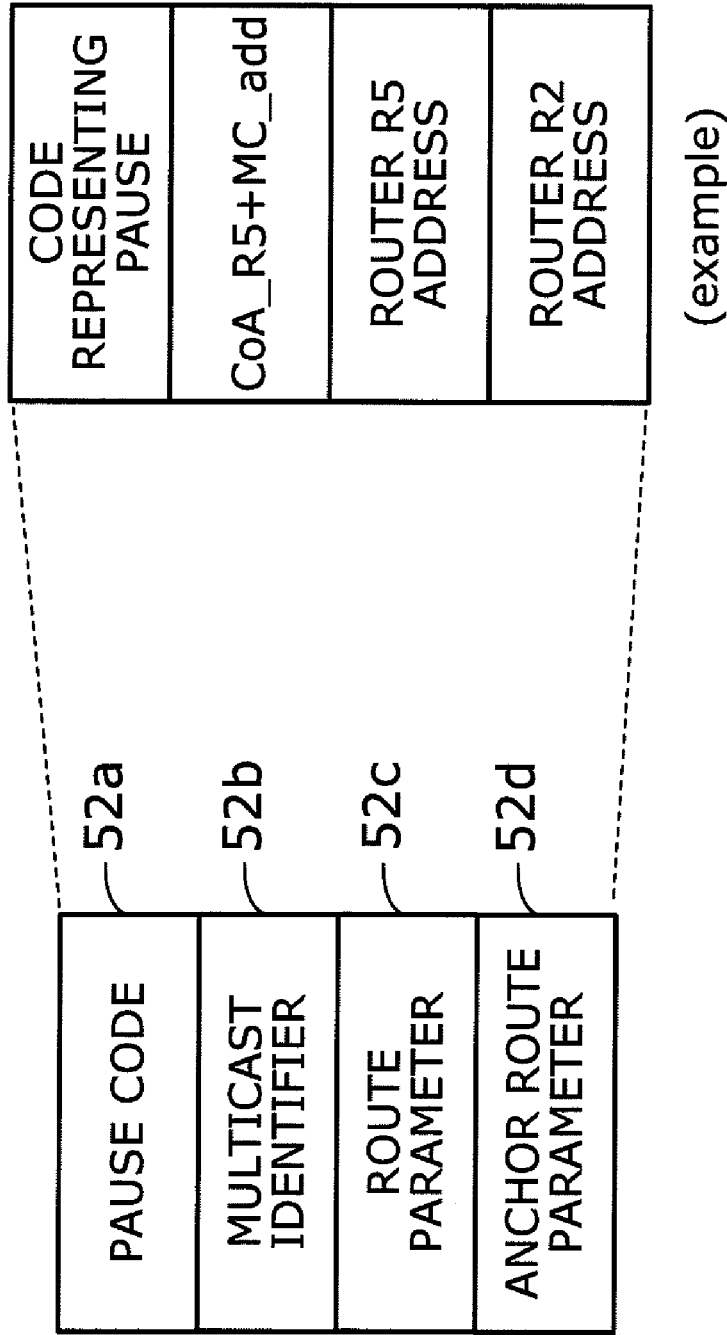
FIG. 8 shows the structure of an anchor appointment command.
Figure 9:
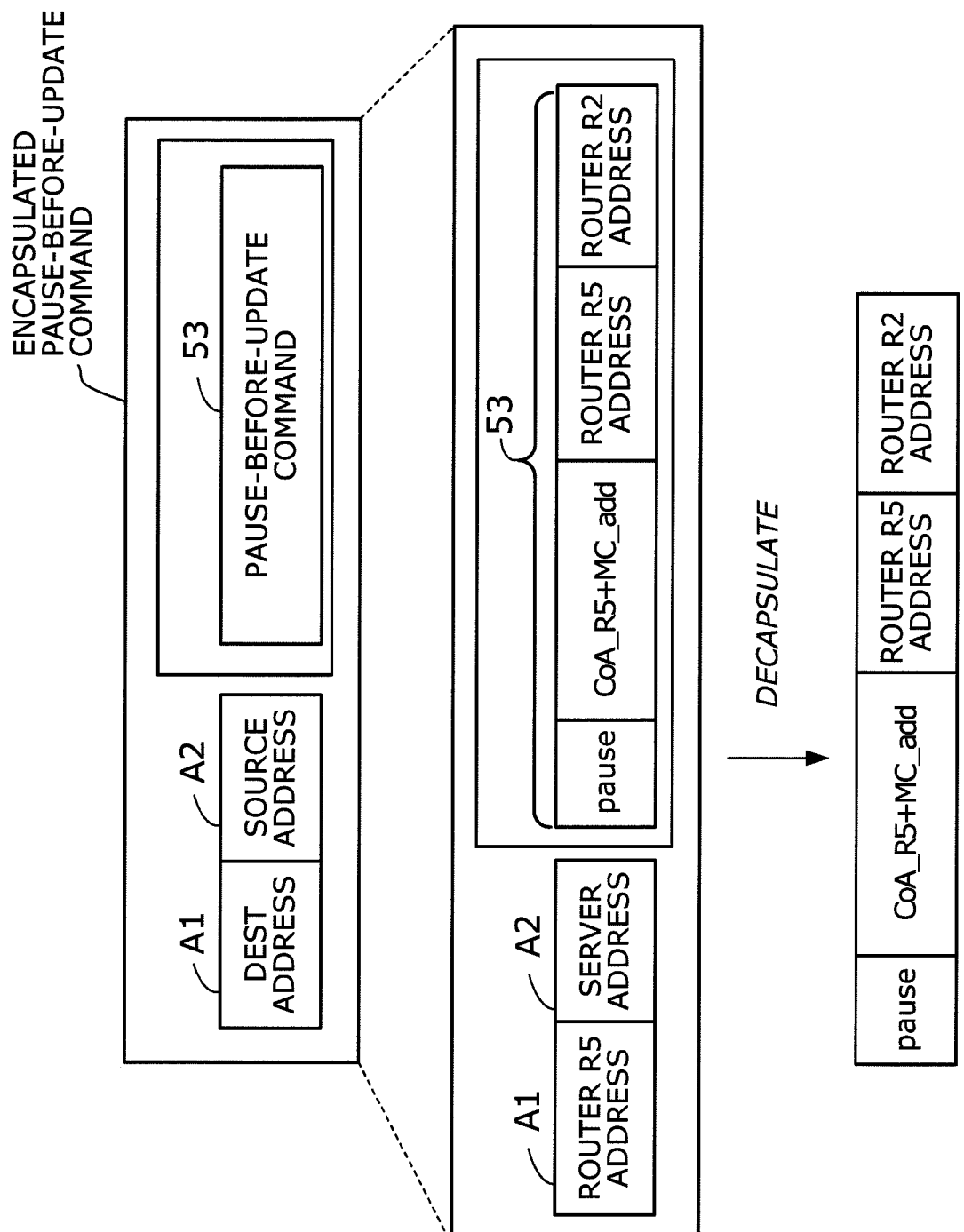
FIG. 9 shows the structure of an encapsulated pause-before-update command.

Referring now to FIGS. 7 to 9, the following part of the description will focus on how the third embodiment operates. FIG. 7 shows how the multicast communications system 1b of FIG. 6 operates. Note that what have been described as "packet routing devices" 30b-1 to 30b-5 in FIG. 6 will now be called "routers" R1 to R5 in the following description.

Multicast packets from the transmitting device 10b can be delivered to receiving terminals 41 and 42 through either of two routes given by multicast trees M1b and M2b. Specifically, one multicast tree M1b goes from the transmitting device 10b to router R5, and then to router R1, where one branch extends to one receiving terminal 41 and another branch goes through routers R3 and R4 before reaching the other receiving terminal 41. Another multicast tree M2b starts from the transmitting device 10b and then goes to router R5, router R2, and router R3, where one branch extends to one receiving terminal 41 via router R1 and another branch goes to the other receiving terminal 42 via router R4. It is assumed that the system uses the former multicast tree M1b initially to deliver packets.

(S21) The transmitting device 10b sends multicast packets to router R5 to which it attaches. Those packets have their respective sequence numbers #1 to #4.

(S22) In an attempt to change multicast trees from M1b to M2b, the network control server 20b creates and sends an anchor appointment command to router R2.

FIG. 8 shows the structure of an anchor appointment command. This anchor appointment command 52 is formed from a pause code 52a, a multicast identifier 52b, a route parameter 52c, and an anchor route parameter 52d. The pause code 52a instructs the receiving router to build a new multicast tree after making a pause. Note that the pause code 52a includes no information about trigger conditions specifying when to change multicast trees, such as the sequence number of a last-sent packet.

The multicast identifier 52b has the same format as the multicast identifier explained earlier in FIG. 3. The route parameter 52c is the address of a router to which the transmitting device 10b currently attaches. The anchor route parameter 52d gives the address of the anchor routing device (or "anchor router") 30b-2.

The right half of FIG. 3 gives an example of this anchor appointment command 52. Specifically, the pause code 52a is a predefined series of bits that means a pause in updating routes. The multicast identifier 52b has a value of CoA_R5+MC_add (i.e., the care-of address of the transmitting device 10b attaching to router R5 plus the MC address the transmitting device 10b). The route parameter 52c gives the address of router R5, and the anchor route parameter 52d the address of router R2. The care-of address may be replaced with a MAC address in the case of fixed terminals. In the present example, the transmitting device 10b has the capability of mobile communication, but it happens to be used as a fixed station, and hence the care-of address. The data field containing a pause code 52a in this example may also contain other parameters of multicast control data, as will be described later in FIG. 14.

(S23) Upon receipt of the anchor appointment command, router R2 examines the anchor route parameter of the received instruction. If its own address is found there, router R2 recognizes itself as an anchor router.

Router R2 then replaces the multicast identifier value "CoA_R5+MC_add" with "CoA-R2+MC_add" based on the information given by the anchor route parameter. Router R2 then enters the state where it waits for an entry request from its subordinate router R3, in order to ensure that router R5 will receive an entry request only when an entry request from router R3 arrives.

(S24) In an attempt to change multicast trees from M1b to M2b, the network control server 20b creates and sends a pause-before-update command to router R5 in encapsulated form.

FIG. 9 shows the structure of an encapsulated pause-before-update command. The network control server 20b encapsulates a pause-before-update command 53, which is in the same format as the anchor appointment command 52, by adding a destination address A1 and a source address A2. Specifically, the destination address A1 designates router R5, and the source address A2 designates the network control server 20b. The pause-before-update command 53 includes a multicast identifier with a value of "CoA_R5+MC_add."

(S25) Upon receipt of the encapsulated pause-before-update command, router R5 decapsulates it to extract the pause-before-update command contained therein.

This pause-before-update command is delivered first to router R1, and then to routers R3 and R4 according to the initial multicast tree M1b.

(S26) Router R5 receives packets #5 to #8 from the transmitting device 10b. Router R5 keeps those packets in a buffer until an entry request for multicast service is received from router R2.

(S27) Routers R1 and R3 finds that the received pause-before-update command contains the same multicast identifier as before, and that it specifies an anchor router. Routers R1 and R3 then sends an entry request for multicast service to the specified anchor router (router R2). Since the pause-before-update command includes a pause code, no updates are made to the current multicast tree for the time being.

(S28) To initiate a change of multicast tree, router R5 creates trigger data containing a sequence number indicating the last forwarded packet at the time when a pause-before-update command was received from the network control server 20b. Specifically, the sequence number should be #4 in the present case. Router R5 transmits this trigger data to the next router on the initial multicast tree M1b. The transmitted trigger data is then delivered to routers R1, R3, and R4 in that order, according to the multicast tree M1b.

(S29) Now that the received trigger data gives a specific sequence number #4 as a trigger for update, routers R1 and R3 maintain the current multicast tree M1b until the specified packet #4 comes and goes.

(S30) In response to an entry request from its subordinate router R3, router R2 sends an entry request to router R5.

(S31) Upon receipt of the entry request from the anchor router R2, router R5 transmits pending packets in the buffer to router R2.

(S32) Router R2 forwards the packets to a new multicast tree M2b according to the given multicast identifier.

(S33) Routers R1 and R3 may receive packets from the new multicast tree M2b during the time when the initial multicast tree M1b is still maintained. Routers R1 and R3 hold those packets in their respective buffers until they receive and forward a packet with a sequence number #4. The passing of packet #4 acts as a trigger for switching to the new multicast tree M2b. The buffered packets are then delivered to their destinations according to the new multicast tree M2b.

Fourth Embodiment

This section describes a multicast communications system according to a fourth embodiment of the present invention. The foregoing first and second embodiments begin a process of switching multicast trees after the transmitting device 10 has moved. In contrast, the fourth embodiment builds a new multicast tree before the transmitting device 10 moves and multicasts packets.

Figure 10:
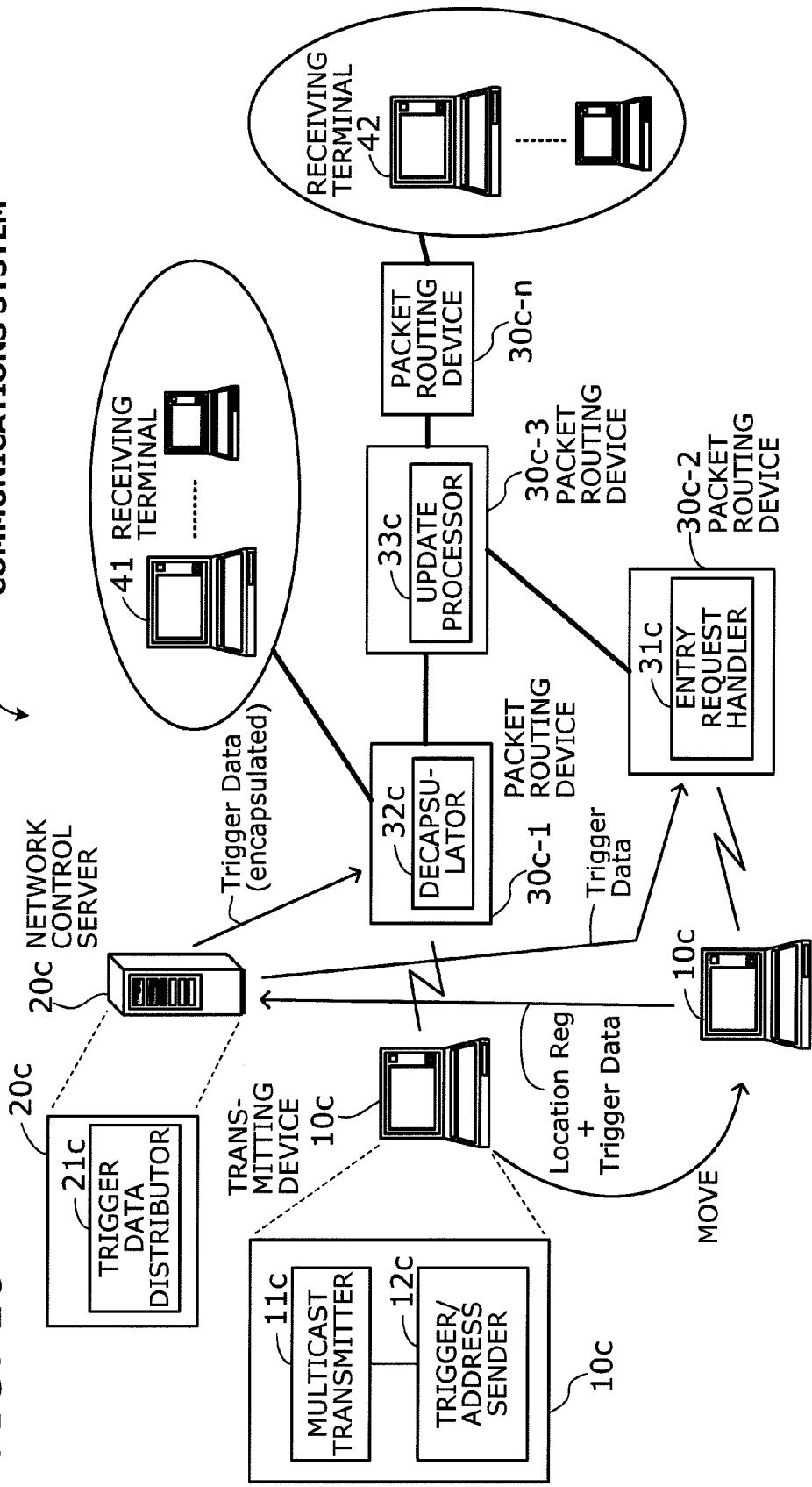
FIG. 10 shows the structure of a multicast communications system according to a fourth embodiment of the present invention.

FIG. 10 shows the structure of a multicast communications system according to the fourth embodiment. This multicast communications system 1c is formed from a transmitting device 10c, a network control server 20c, packet routing devices 30c-1 to 30c-n (collectively referred to by the reference numeral "30c"), and receiving terminals 41 and 42. The network connects those elements basically in the same way as in the multicast communications system 1 of FIG. 1.

The transmitting device 10c includes a multicast transmitter 11c and a trigger/address sender 12c. The multicast transmitter 11c adds a sequence number to each of outgoing packets in the order that they are sent out for multicasting.

The trigger/address sender 12c produces and sends trigger data to the network control server 20c during a multicast session. The trigger data is a piece of information, including the sequence number of a particular packet, that initiates a change from an initial multicast tree to a new multicast tree. In addition, the trigger/address sender 12c sends beforehand the network control server 20c the address of a routing device that the transmitting device 10c is going to visit. In the example of FIG. 10, the trigger/address sender 12c sends the address of a packet routing device 30c-2.

The network control server 20c has a trigger data distributor 21c to forward received trigger data to a new access point (the packet routing device 30c-2 in FIG. 10) to which the transmitting device 10c has moved. The trigger data distributor 21c also sends an encapsulated version of the trigger data to the previous access point (the packet routing device 30c-1 in FIG. 10) to which the transmitting device 10c has attached before the movement.

Each packet routing device 30c includes an entry request handler 31c, a decapsulator 32c, and an update processor 33c. The entry request handler 31c serves in the packet routing device 30c-2 at a new access point to which the transmitting device 10c is going to attach. Upon receipt of trigger data, the entry request handler 31c enters the state where it waits for its subordinate routing device to issue an entry request for multicast service. When an entry request is received, the packet routing device 30c begins to route packets from the transmitting device 10c to the new multicast tree.

In the packet routing device 30c-1 at the previous access point of the transmitting device 10c, the decapsulator 32c decapsulates encapsulated trigger data received from the network control server 20c. The decapsulator 32c sends the decapsulated trigger data to other routing devices on the initial multicast tree.

In other packet routing devices 30c that forward packets from their peer devices, the update processor 33c finds a sequence number specified in given trigger data. The update processor 33c uses the initial multicast tree and does not update it with a new route until a packet having the specified sequence number comes and goes.

Figure 11:
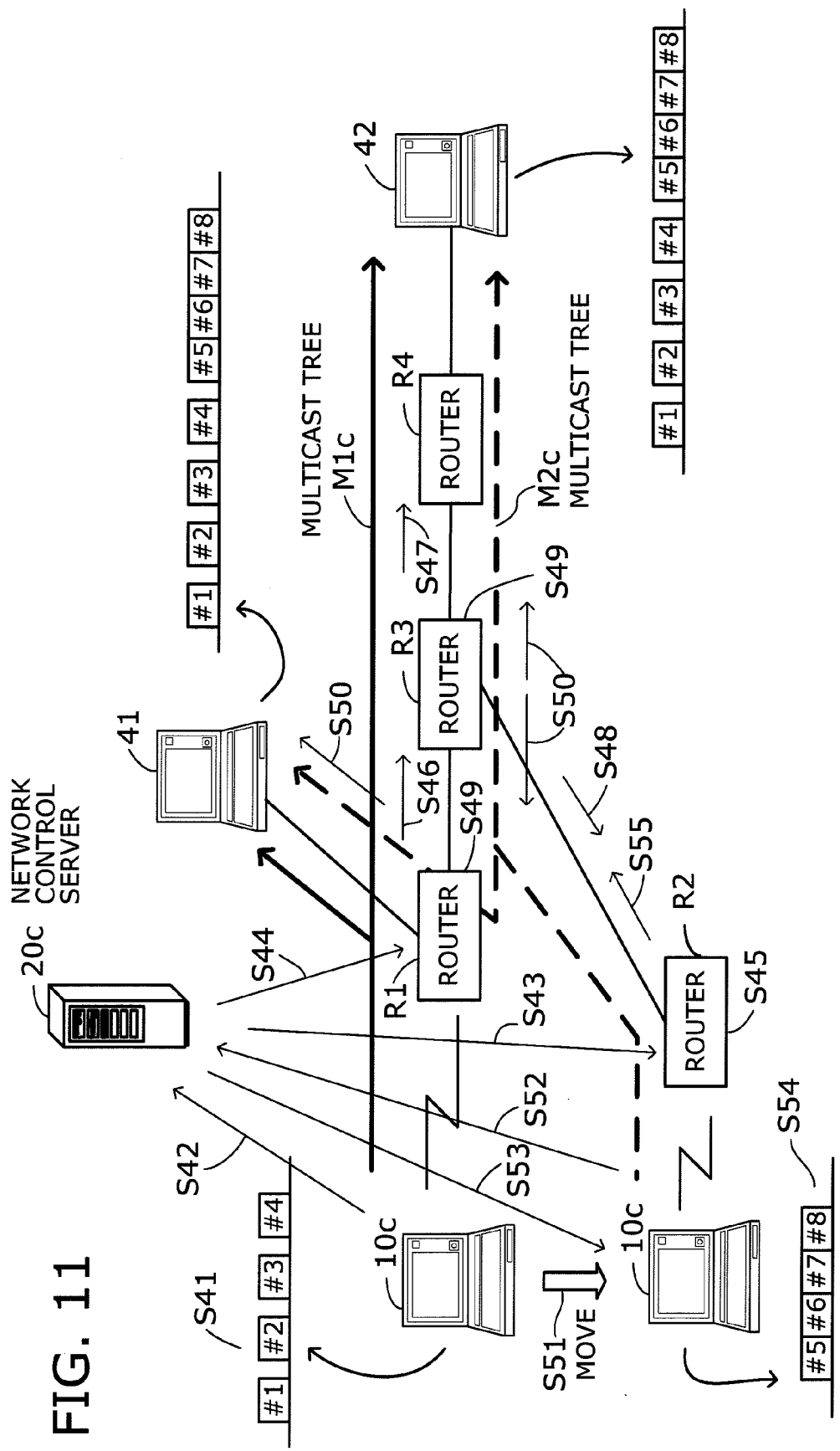
FIG. 11 shows how the multicast communications system of FIG. 10 operates.

Referring now to FIG. 11, the following will describe how the multicast communications system 1c operates according to the fourth embodiment. Note that what have been described as the packet routing devices 30-1 to 30-4 will be called "routers" R1 to R4 in this section. The multicast communications system 1c uses the same trigger data, including its encapsulated version, as those described earlier in FIGS. 3 and 4.

(S41) The transmitting device 10c sends multicast packets to router R1 to which it is attaching.

Those packets have their respective sequence numbers #1 to #4.

(S42) The transmitting device 10c produces and sends trigger data to the network control server 20c during the multicasting session. The trigger data, including the sequence number of a particular packet, initiates a change from an initial multicast tree to a new multicast tree. The transmitting device 10c also sends the network control server 20c the address of a router to which the transmitting device 10c is going to visit. In the example of FIG. 11, the trigger data carries the address of router R2.

(S43) The network control server 20c forwards the trigger data from the transmitting device 10 to router R2.

(S44) The network control server 20c also encapsulates the received trigger data and forwards it to router R1.

(S45) By examining the received trigger data, router R2 finds that the address of its own is specified as a new route parameter of the data. Router R2 then enters the state where it waits for its subordinate router R3 to issue an entry request for multicast service.

(S46) Upon receipt of the encapsulated trigger data, router R1 decapsulates it (i.e., removes encapsulation header information) and forwards its content (i.e., trigger data before encapsulation) to router R3.

(S47) Router R3 further forwards the trigger data to router R4 since it has a multicast destination address "CoA_R1+ MC_add." The forwarding operation of this kind permits all routers on the initial multicast tree M1c to receive the trigger data.

(S48) In response to an entry request from its subordinate router R3, router R2 updates its multicast table with a new multicast tree M2c.

(S49) Some of the routers that have received trigger data have to change their forwarding directions according to the new multicast tree M2c. In the present example, routers R1 and R3 have to do this. Such routers, however, implement the change from M1c to M2c (or update their multicast tables for that) not immediately. Instead, those routers maintain the initial multicast tree M1c until they receive and forward packet #4. This means that two multicast trees coexist in some part of the network during that particular transitional period.

(S50) Routers R1 and R3 may receive packets from the new multicast tree M2c during the time when the initial multicast tree M1c is still maintained. Routers R1 and R3 hold those packets in their respective buffers until they receive and forward a packet with a sequence number #4. The passing of packet #4 acts as a trigger for switching to the new multicast tree M2c. The buffered packets are then delivered to their destinations according to the new multicast tree M2c.

(S51) The transmitting device 10c now moves and attaches to router R2.

(S52) The transmitting device 10c registers its location with the network control server 20c.

(S53) The network control server 20c returns acknowledgment of the location registration back to the transmitting device 10c.

(S54) The transmitting device 10c sends packets #5 to #8 to router R2.

(S55) Using the new multicast tree M2c, router R2 distributes those packets received from the transmitting device 10.

Updating Multicast Table

Figure 12:
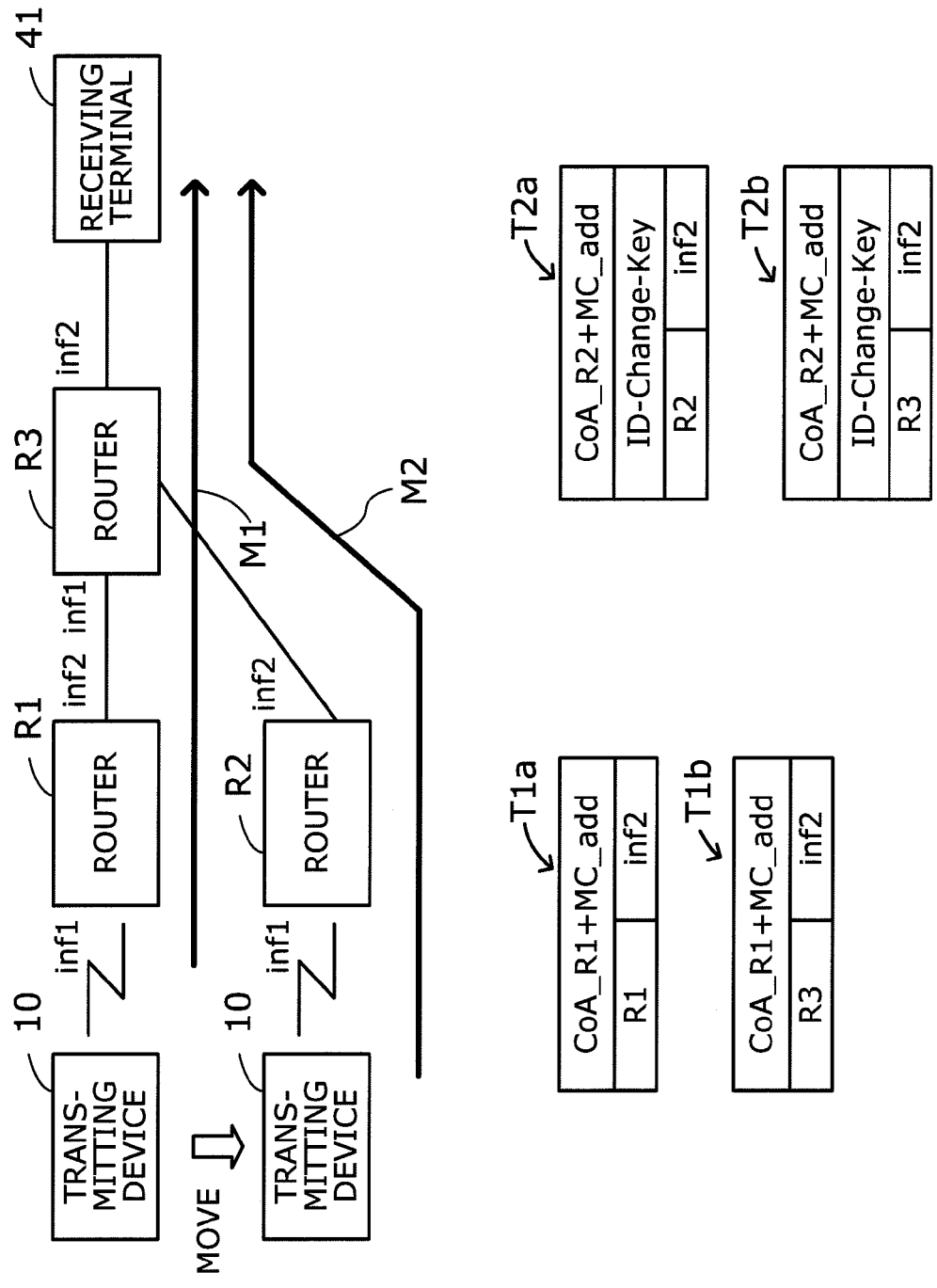
FIGS. 12 and 13 show how multicast tables are updated.
Figure 13:
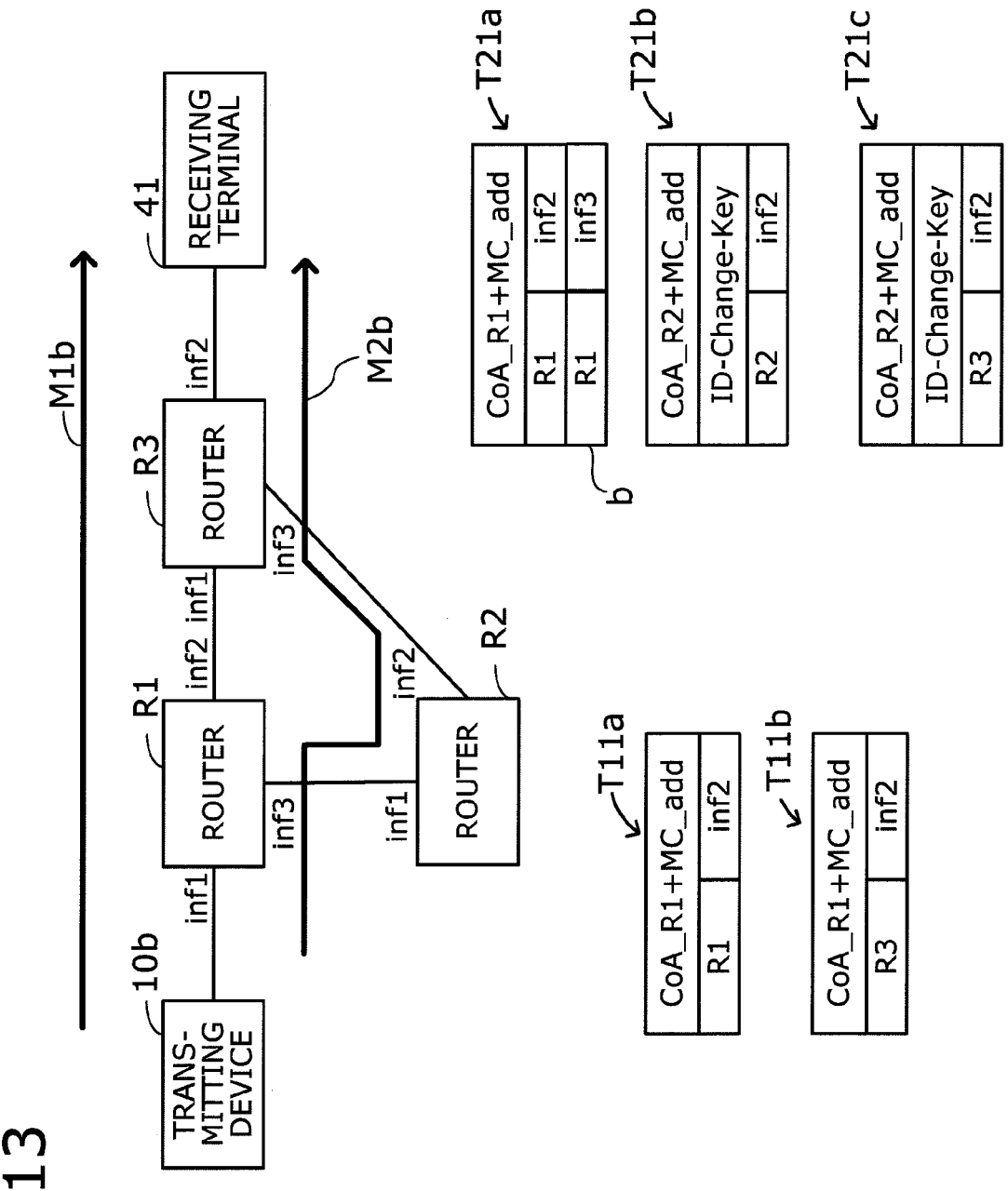

Referring here to FIGS. 12 and 13, this section will explain how multicast tables are updated during a multicast session. FIG. 12 shows the case where a transmitting device 10 is a mobile station. Router R1 is connected to router R3, to which router R2 and a receiving terminal 41 are liked. Suppose that the transmitting device 10 attaches initially to router R1 and moves later to router R2.

The initial multicast tree M1 gives a route from the transmitting device 10 to the receiving terminal 41 via router R1 and router R3. A new multicast tree M2 gives a route via routers R2 and R3 to connect the same source and destination.

Router R1 uses a table T1a for transport over the initial multicast tree M1. Suppose that router R1 receives from the transmitting device 10 a packet with a multicast identifier (ID) of (CoA_R1+MC_add) specifying destinations. Router R1 outputs this packet to its port inf2 since the table T1a instructs router R1 to direct received packets to port inf2 if they are addressed to CoA_R1+MC_add.

Router R3, on the other hand, has a table T1b for the initial multicast tree M1, which instructs router R3 to direct every received packet to port inf2 if it is addressed to CoA_R1+ MC_add. According to this table T1b, router R3 forwards the packet from router R1 to port inf2. In this way, the multicast packet transmitted from the transmitting device 10 is relayed from router to router according to the multicast tree M1 until it finally reaches the receiving terminal 41.

Router R2 uses a table T2a for transport over a new multicast tree M2. The table T2a includes an ID-Change-Key produced by exclusive-ORing CoA_R1+MC_add and CoA_R2+MC_add. Suppose now that router R2 receives from the transmitting device 10 a packet with a multicast ID of (CoA_R1+MC_add) specifying destinations. Upon receipt, router R2 obtains CoA_R2+MC_add by exclusive ORing CoA_R1+MC_add and ID-Change-Key. Router R2 outputs the received packet to port inf2 since the table T2a instructs router R2 to direct packets to port inf2 if they are addressed to CoA_R2+MC_add.

Router R3, on the other hand, has a table T2b for the new multicast tree M2, and it now receives from router R2 the packet with a multicast ID of CoA_R1+MC_add. Upon receipt, router R3 obtains CoA_R2+MC_add by exclusive ORing CoA_R1+MC_add and ID-Change-Key. Router R3 then forwards the packet from router R2 to port inf2 since the table T2b instructs router R3 to direct packets to port inf2 if they are addressed to CoA_R2+MC_add.

As can be seen from the above example, each router updates its own table autonomously to modify the delivery route of multicast packets, without the need for the sender to make any change to the packets that it transmits.

Specifically, the transmitting device 10 does not need to change the multicast ID (CoA_R1+MC_add) of packets even when the current multicast tree is to be switched to another one. Instead, router R2 changes its table from T1a to T2a, and router R3 changes its table T1b to T2b. Actually, routers R2 and R3 overwrite their respective tables with new ones.

FIG. 13 shows how multicast tables are updated in the case where the multicast tree is changed for some reason other than movement of a terminal station. Router R1 is connected to router R3, to which router R2 and a receiving terminal 41 are liked. A transmitting device 10b attaches to router R1 in a fixed manner. The initial multicast tree M1b gives a route from the transmitting device 10b to the receiving terminal 41 via router R1 and router R3. A new multicast tree M2b gives an alternative route to connect the same source and destination, going through routers R1, R2, and R3 in that order.

Router R1 uses a table T11a for transport over the initial multicast tree M1b. Suppose that router R1 receives from the transmitting device 10b a packet with a multicast ID of (CoA_R1+MC_add) specifying destinations. Router R1 outputs this packet to its port inf2 since the table T11a instructs router R1 to direct received packets to port inf2 if they are addressed to CoA_R1+MC_add.

Router R3, on the other hand, has a table T11b for the initial multicast tree M1, which instructs router R3 to direct every received packet to port inf2 if it is addressed to CoA_R1+ MC_add. According to this table T11b, router R3 forwards the packet from router R1 to port inf2. In this way, the multicast packet transmitted from the transmitting device 10b is relayed from router to router according to the initial multicast tree M1b until it finally reaches the receiving terminal 41.

Router R1 uses a table T21a for transport over a new multicast tree M2b. Router R1 receives from router R3 an entry request for the new multicast tree M2b. Router R1 also receives a packet with a multicast ID of CoA_R1+MC_add from the transmitting device 10b. By consulting the table T21a, router R1 finds an entry that instructs router R1 to direct packets to port inf3 if they are addressed to CoA_R1+ MC_add. According to the table T21a, router R1 outputs the received packet to port inf3.

Router R2 has a table T21b for the new multicast tree M2b. The table T21b includes ID-Change-Key produced by exclusive-ORing CoA_R1+MC_add and CoA_R2+MC_add. Upon receipt of the packet with a multicast ID of CoA_R1+ MC_add from router R1, router R2 obtains CoA_R2+ MC_add by exclusive ORing CoA_R1+MC_add and ID-Change-Key. Router R2 outputs the received packet to port inf2 since the table T21*b* instructs router R2 to direct packets to port inf2 if they are addressed to CoA_R2+MC_add.

Router R3, on the other hand, has a table T21*c* for the new multicast tree M2, and it now receives from router R2 the packet with a multicast ID of CoA_R1+MC_add. Upon receipt, router R3 obtains CoA_R2+MC_add by exclusive ORing CoA_R1+MC_add and ID-Change-Key. Router R3 then forwards the packet from router R2 to port inf2 since the table T21*c* instructs router R3 to direct packets to port inf2 if they are addressed to CoA_R2+MC_add.

Multicast Control Data

The foregoing embodiments of the present invention provide routers with a sequence number and a pause code to enables them to change multicast trees individually. Such sequence number and pause code are actually defined as parameters of multicast control data. For more flexible control of multicasting, the multicast communications system may use more parameters as will be described below.

Figure 14:
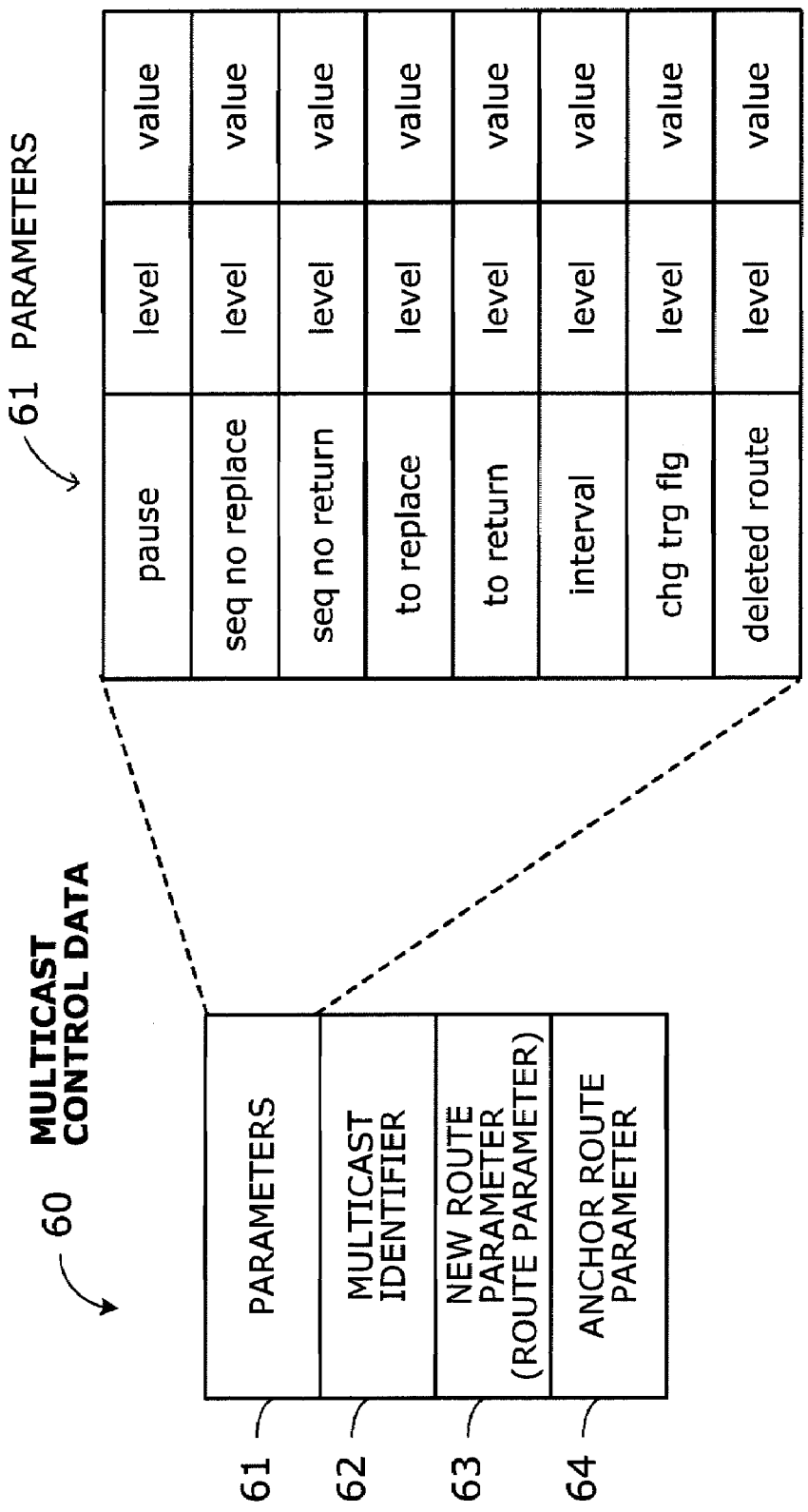
FIG. 14 shows multicast control data.

FIG. 14 shows multicast control data. Multicast control data 60 is a collection of the following data items: parameters 61, a multicast identifier 62, a new route parameter (route parameter) 63, and an anchor route parameter 64.

Specifically, the following is a list of parameters 61, which may be referred to also as data element options.

"pause" is a command requesting routers to maintain their current multicast tree as is until they receive a message or signal that permits them to update it.

"seq no replace" gives a sequence number of a particular packet that permits routers to update their multicast trees. A new multicast tree takes effect only after they receive and forward that particular packet.

"seq no return" gives a sequence number of a particular packet that initiates a revert operation. When a packet having this sequence number is received and forwarded, the routers are supposed to delete their new multicast tree and revert to the previous multicast tree.

"to replace" gives a timer for updating multicast trees. In the case where this parameter is received, routers update their multicast tree upon expiration of the specified time.

"to return" gives a timer for revert operation. In the case where this parameter is received, routers revert to the previous multicast tree upon expiration of the specified time.

"interval" gives a timer for enabling a new multicast tree connection. In the case where this parameter is received, routers wait for the specified time before enabling their new multicast tree connection.

"chg trg flg" is an option of sending a switching completion notice. A multicast tree has a root router at its root node. Other routers send a switching completion notice (chg trg flg) to the root router of the previous tree when they have updated their multicast tree.

"deleted route" specifies a route that is ineligible for multicasting. This parameter makes it possible to deliver multicast packets without using a particular route that is specified explicitly.

"level" gives a weight to each parameter. More specifically, it indicates priority of each parameter. Assume, for example, that a greater "level" value means a higher priority. Then suppose that a router has received two instances of "seq no return", one with level=1 and the other with level=2. In this case, the router is supposed to process the latter in preference to the former.

Each of the above parameters takes a specific "value" in addition to a priority level. While FIG. 14 shows all the parameters described above, it does not mean that the multicast control data 60 always includes all those parameters. Rather, the multicast control data 60 may include one or more necessary parameters selected out of those shown in FIG. 4.

Multicast Communications Systems

Figure 15:
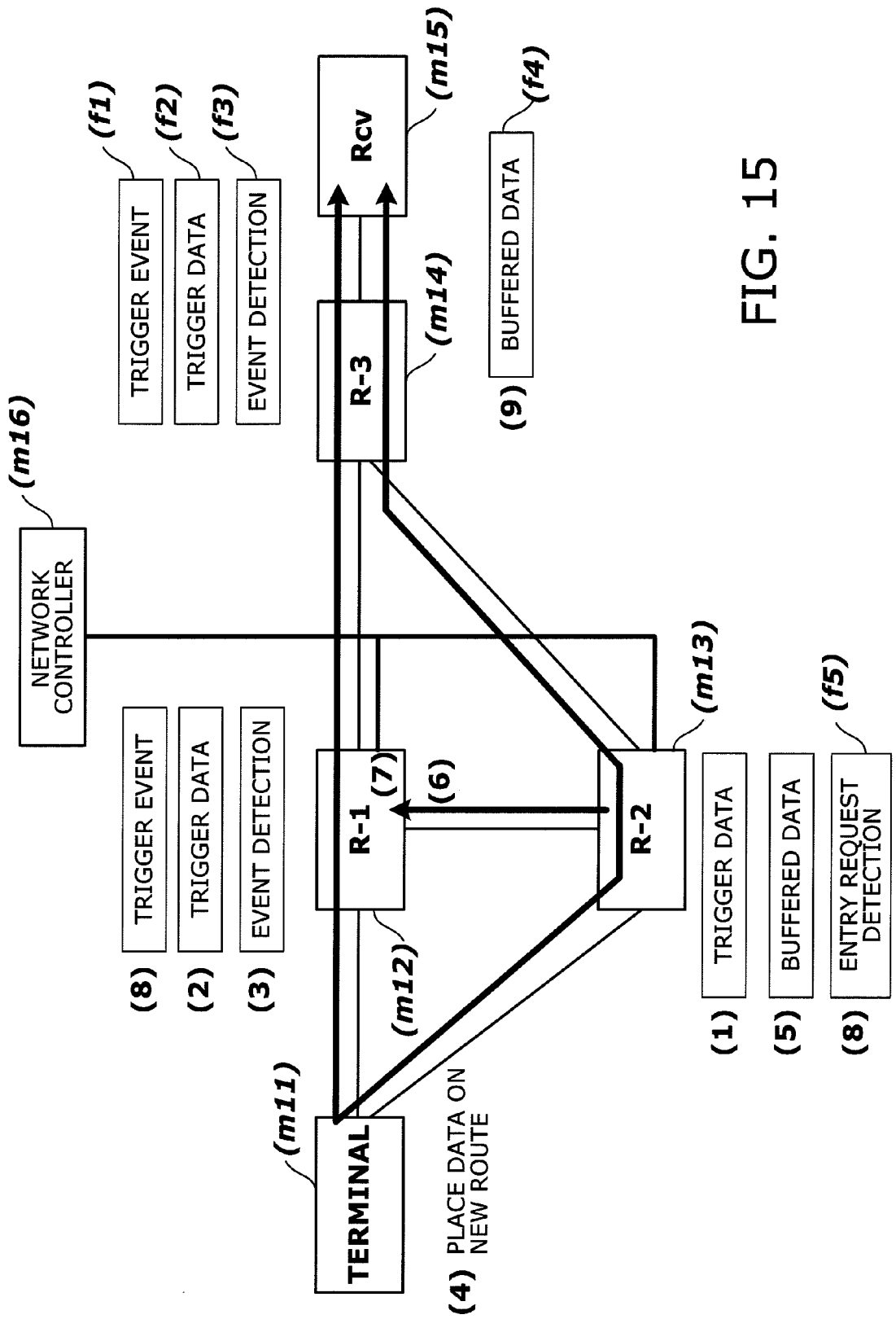
FIG. 15 is a first conceptual view of a multicast communications system.

This section describes the principle concept of multicast communications systems. FIG. 15 is a first conceptual view of a multicast communications system, where it is assumed that the network changes multicast routes on purpose, without involving any particular control on the part of a transmitting device. Specifically, the system of FIG. 15 involves the following elements:

m11: Non-mobile terminal m12: Router R-1 according to the present invention, located on an initial multicast route m13: Router R-2 according to the present invention located on a new multicast route m14: Router R-3 according to the present invention, located at the confluence of the initial and new routes m15: Typical receiving terminal (Rcv)

m16: Network controller that changes multicast routes for reasons on the part of the network f1: Trigger event specified as a data element option. This may be, for example, a timeout event in the case of timed update. Timed update specifies that the multicast table be updated upon expiration of a specified time, no matter what multicast data is being transmitted. In the case of sequence number-based update, transmission of data with a specific multicast identifier and a specific sequence number will be a trigger event for update.

f2: Trigger data specifying a trigger condition such as expiration of a specific time or transmission of multicast data with a specific sequence number f3: Process that a device performs to detect the trigger event of f2 f4: Buffered data (multicast transmission data is stored in a buffer)

f5: Entry request detection, the function of detecting an entry request for multicast service from a subordinate router The following explains how the above elements work.

(1): Element m16 sends trigger data to instruct element m13 to be ready for update. Element m13 is so requested because it is where the new multicast route starts.

(2): Element m16 sends the trigger data to the initial route. (Trigger data can be sent earlier if a sufficiently large sequence number is set to the value field of the corresponding data element option.) This information is multicast to routers on the initial multicast route (i.e., m12 and m14 in FIG. 15).

(3): Elements m12 and m14 store and maintain the received trigger data of (2). What they actually do in this action is determined by the values of data element options specified in the trigger data of (2). Suppose, for example, that the trigger data includes "interval" option. In this case, elements m12 and m14 will send an entry request to routers on a new route specified by new_route upon expiration of the time specified as an interval value. Suppose, for another example, that the trigger data includes "seq_no_replace" option with an a specific multicast identifier and a specific sequence number. In this case, elements m12 and m14 will update their tables upon detection of multicast data that has the specified sequence number and is addressed to the specified multicast identifier. Elements m12 and m14 maintain such a trigger condition and act on that condition.

(4) Element m11 transmits multicast data to element m13 on a new route.

(5) Element m13 stores the multicast data as transmission data for the new route.

(6) Element m13 further transmits the multicast data in encapsulated form to element m12 on the initial route by using its encapsulation function.

(7) The multicast data of (6) is forwarded over the initial route, from m12 to m14, and then to m15.

(8) Upon receipt of the trigger data of (1), element m13 begins waiting for an entry request addressed thereto. Upon detection of such an entry request, element m13 releases the stored data of (5) to the new route.

(9) Element m14, a subsequent node of the tree, is located at the confluence of the initial and new routes. For this reason, element m14 keeps data in a buffer until the trigger event of (3) occurs. This buffering may act only on the data after the trigger event of (3).

(10) The route is changed upon detection of the trigger event set at (3). At this time, element m12 (which belongs to the initial route as a previous access point for m11) removes the path from m12 to m14 on the initial route since the new multicast tree has no branch corresponding to that path. Element m14, on the other hand, switches to a new route since it is involved as part the new route from element m13. Upon switching, element m14 sends out stored packets to the new route if those packets are supposed to come after a particular packet or event specified by the trigger data of (3).

Element m12 may request element m13 to stop the encapsulation of (6) when element m12 finds that the table has been updated. A more effective way is to configure the element m13 such that it will stop itself from sending encapsulated multicast data when a trigger condition given in the trigger data of (3) is met, thus eliminating the need for element m12 to send a signal.

Figure 16:
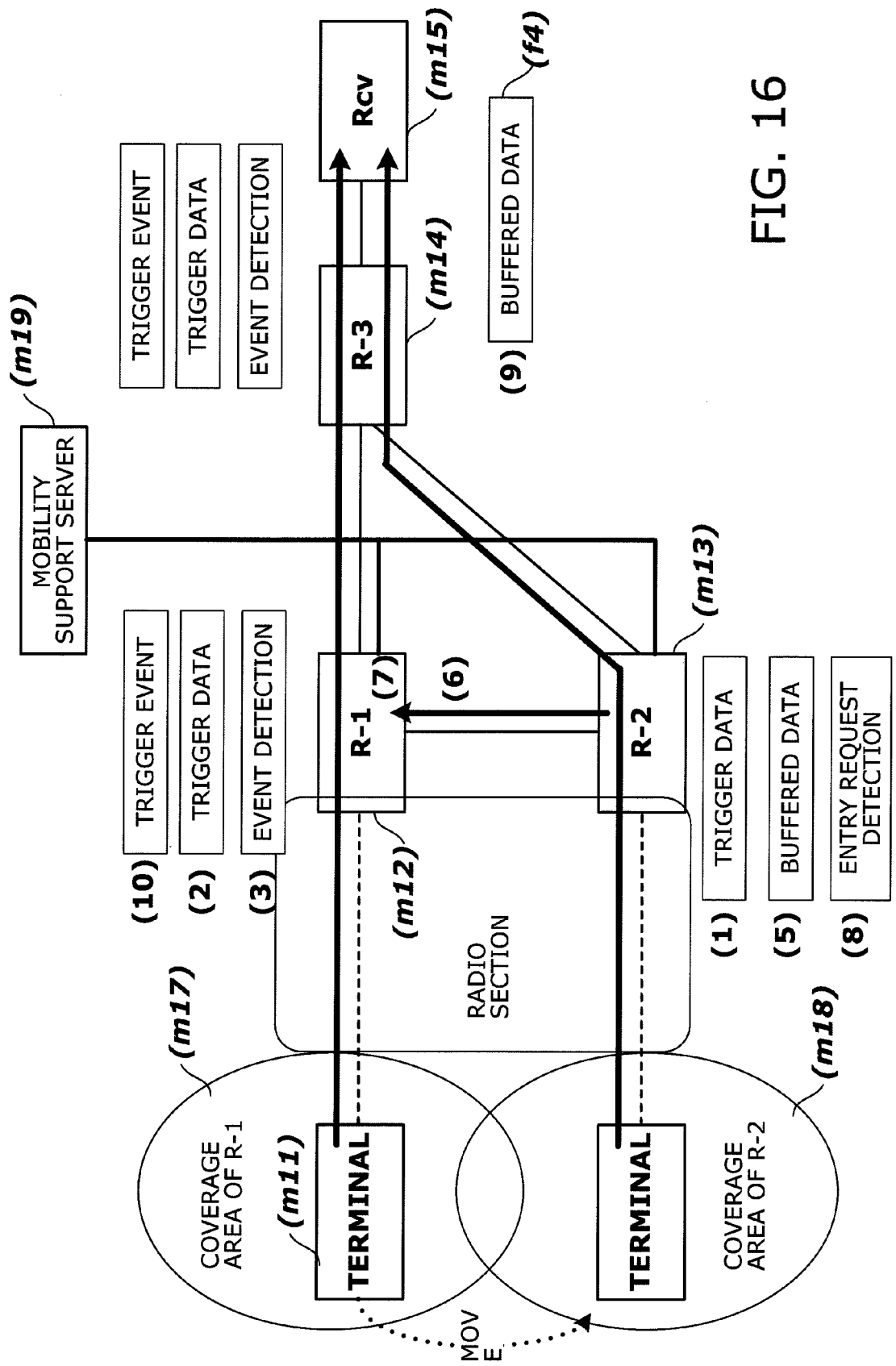
FIG. 16 is a second conceptual view of a multicast communications system.

FIG. 16 is a second conceptual view of a multicast communications system that allows a terminal to move from one router to another under the control of a mobile support system (server). Specifically, the system of FIG. 16 involves the following elements:

m11: Mobile terminal which may change its location m12: Router R-1 according to the present invention, located on an initial multicast route m13: Router R-2 according to the present invention located on a new multicast route m14: Router R-3 according to the present invention, located at the confluence of the initial and new routes m15: Typical receiving terminal (Rcv)

m17: Initial area, under the control of m12 m18: Visited area, under the control of m13 m19: Server that supports mobility of m11

Figure 17:
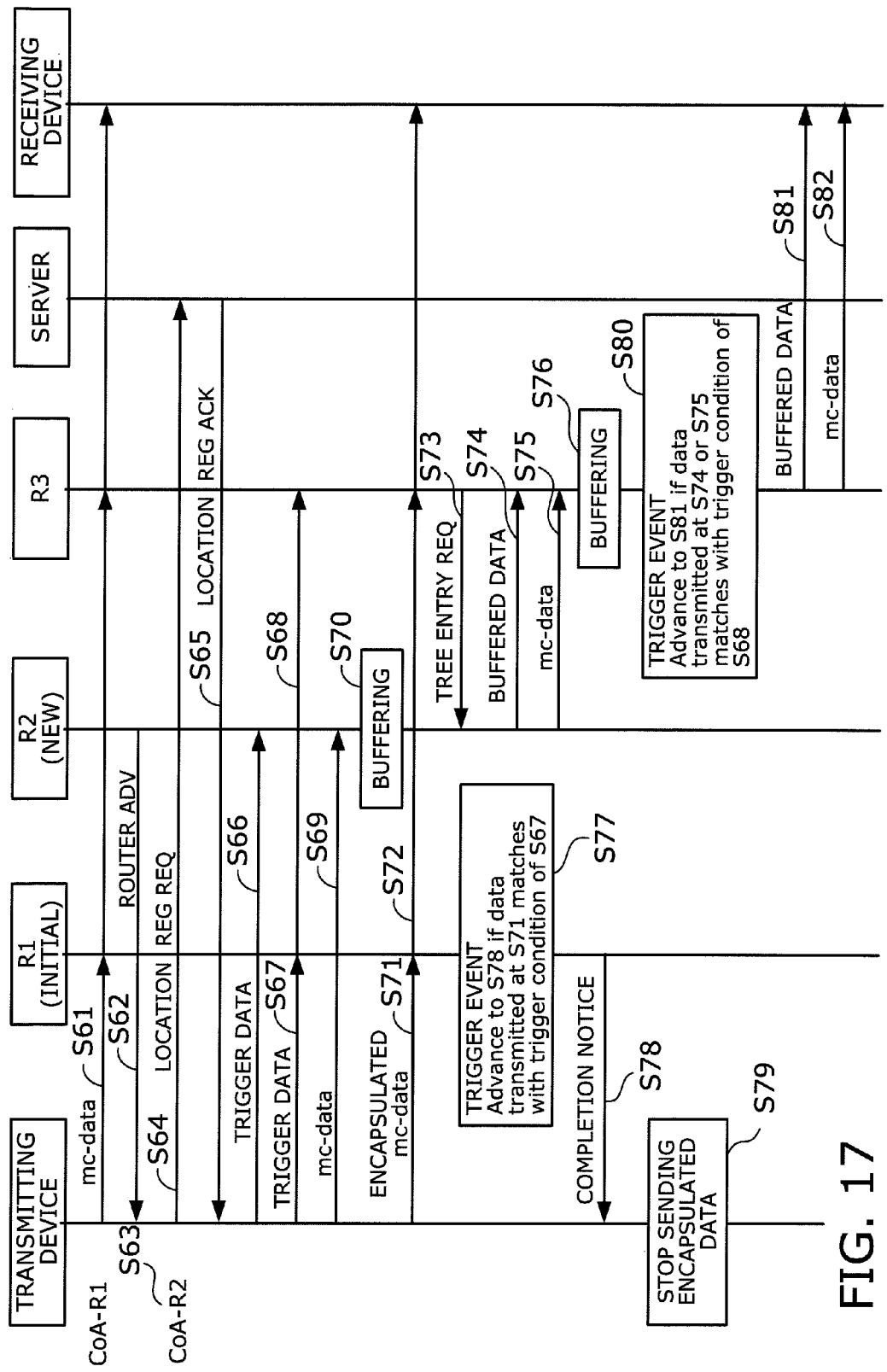
FIG. 17 shows an example sequence where a transmitting device takes the initiative in changing multicast routes.
Figure 18:
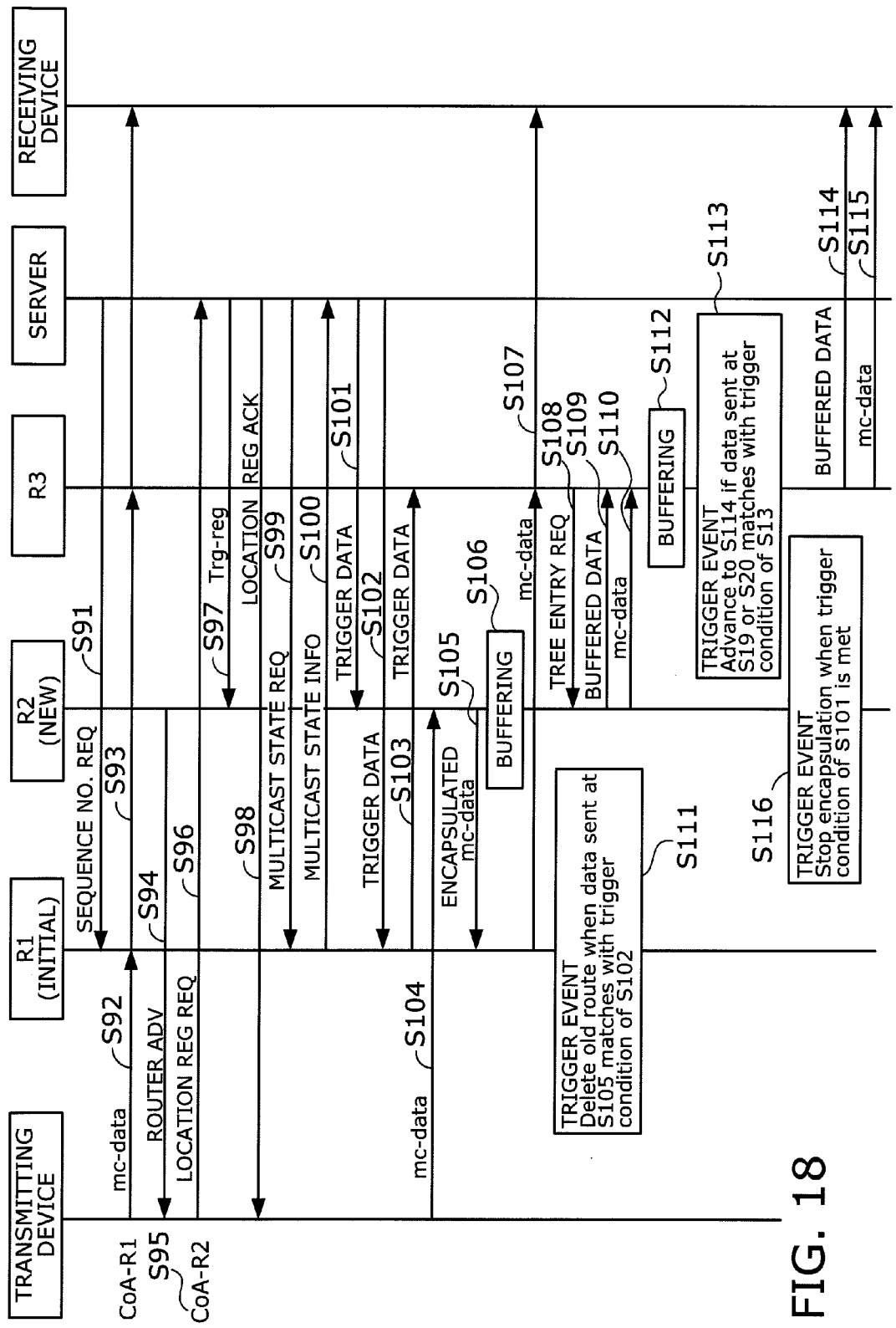
FIG. 18 shows an example sequence where the network takes the initiative in changing multicast routes.
Figure 19:
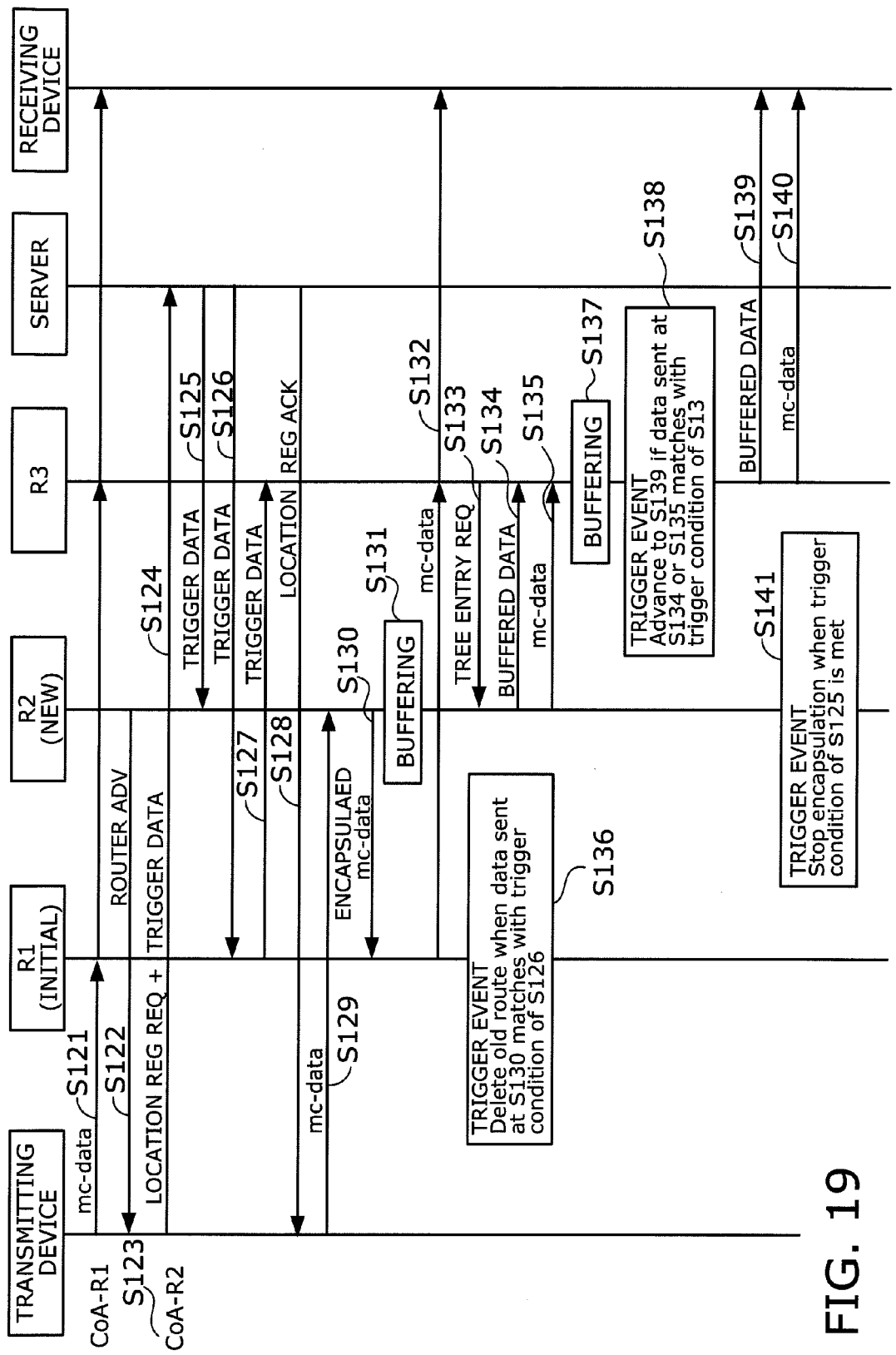
FIG. 19 shows an example sequence where the terminal and network operate together to change multicast routes.

Most elements are common to those in FIG. 15. One difference is that element m11 has mobility in the system of FIG. 16. Another difference is that a mobility support server replaces the network controller of FIG. 15. Moreover, the system of FIG. 16 can operate in three different ways as will be described below. FIGS. 17, 18, and 19 give their respective sequence diagrams.

1. The transmitting device specifies a trigger condition for changing multicast routes by issuing a trigger data, without involving the mobile support system (details shown in FIG. 17)

2. The mobile support system specifies a trigger condition for changing multicast routes by issuing trigger data, without involving the transmitting device. The network executes the change upon detection of specific data sent from the transmitting device (details shown in FIG. 18)

3. Both the transmitting device and the mobility support system have the function of changing multicast routes of the present invention. Those two elements simplify their tasks while sharing their information with each other. Specifically, the transmitting device sends trigger data to the mobility support system, and the mobile support system configures the network to apply the received trigger data, so that the data transmitted by the transmitting device can be delivered through the initial route until a new route is established (details shown in FIG. 19).

FIG. 17 shows an example sequence where a transmitting device takes the initiative in changing multicast routes.

(S61) The transmitting device 10*a* transmits multicast packets (mc-data) to the initial multicast tree, giving each multicast packet a piece of information indicating the packet sequence.

(S62) The transmitting device 10*a* moves and thus receives a router advertisement from router R2.

(S63) The router advertisement causes the transmitting device 10*a* to replace its care-of address with CoA-R2.

(S64) The transmitting device 10*a* sends a location registration request to the network control server 20*a*.

(S65) The network control server 20*a* returns an acknowledgment of location registration.

(S66) The transmitting device 10*a* sends trigger data to router R2 on a new route.

(S67) Through router R2, the transmitting device 10*a* sends the trigger data to router R1 on the initial route.

(S68) Upon receipt of the trigger data, router R1 sends it to the multicast route (including router R3).

(S69) The transmitting device 10*a* transmits packets to router R2.

(S70) Router R2 puts received packets in a buffer.

(S71) The transmitting device 10*a* encapsulates packets and sends them to router R1 on the initial route.

(S72) Router R1 decapsulates the received packets and transmits the decapsulated packets to the initial route.

(S73) In response to the trigger data, router R3 applies to router R2 for entry to the new multicast tree.

(S74) Upon receipt of the entry request from router R3, router R2 outputs packets stored in the buffer to the new route.

(S75) After the buffered data is sent out, router R2 simply forwards subsequent multicast packets (mc-data) transmitted at step S69.

(S76) The transmitted packets are received by router R3 on the way to the destination. Router R3 buffers those packets if the trigger condition received at S68 is not met.

(S77) Router R1 determines whether any packet sent at step S71 matches with the trigger condition received at step S67. If the condition is met, then router R1 advances to step S78.

(S78) Router R1 notifies the transmitting device 10*a* that the trigger condition has been met.

(S79) The transmitting device 10*a* stops delivery of encapsulated packets to the initial route.

(S80) Router R3 determines whether any packet received at step S74 or S75 matches with the trigger condition received at step S68. If the condition is met, then router R3 advances to step S81.

(S81) Router R3 has been keeping pending packets in its buffer since step S76, some of which may match with the trigger condition given at step S68. Router R3 takes out of the buffer the packets subsequent to that match for delivery to the receiving device.

(S82) After the buffered data is sent out, router R3 simply forwards subsequent multicast packets (mc-data) received at step S75.

FIG. 18 shows an example sequence where the network takes the initiative in changing multicast routes.

(S91) The network control server 20 requests router R1 to add a sequence number to each multicast packet that it sends.

(S92) The transmitting device 10 sends packets (mc-data) to a route that starts from router R1.

(S93) Router R1 forwards the packets received at step S92, giving a sequence number to every outgoing packet.

(S94) The transmitting device 10 moves to the area of router R2, thus receiving a router advertisement of router R2.

(S95) The router advertisement causes the transmitting device 10 to replace its care-of address with CoA-R2.

(S96) The transmitting device 10 sends a location registration request to the network control server 20a.

(S97) The transmitting device 10a sends trigger data to router R2 on a new route.

(S98) The network control server 20 returns acknowledgment of the location registration back to the transmitting device 10.

(S99) The network control server 20 requests router R1 to collect information about a current state of multicasting. Specifically, the network control server 20 requests the latest sequence number that router R1 has added.

(S100) Router R1 returns a response to the information request of step S99.

(S101) Upon receipt of the response, the network control server 20 sends trigger data to router R2, thus specifying a trigger condition for route switching. The trigger data includes multicast control parameters, for use by router R2 to stop sending encapsulated packets.

(S102) Upon receipt of the response, the network control server 20 further sends trigger data to router R1, thus specifying a trigger condition for removal of obsolete route information.

(S103) Besides saving the received trigger data parameters, router R1 sends the data to the multicast route.

(S104) The transmitting device 10 transmits packets to router R2.

(S105) Upon receipt of each packet, router R2 sends an encapsulated version of the received packet to router R1 on the initial route until it reaches the stop point specified by the multicast control parameters of step S101.

(S106) Router R2 also stores the received packets in its buffer.

(S107) Router R1 decapsulates packets received at step S105 for delivery over the initial route.

(S108) In response to the trigger data provided at step S103, router R3 applies to router R2 for entry to the new multicast tree.

(S109) Router R2 has been keeping the packets received at step S106 in its buffer. Upon receipt of the entry request from router R3, router R2 outputs those buffered packets to the new route.

(S110) After sending out the buffered data, router R2 simply forwards subsequent multicast packets (mc-data) transmitted at step S104.

(S111) Router R1 determines whether the packet sent at step S105 matches with the trigger condition received at step S102. If the condition is met, then router R1 removes the route specified by a relevant multicast identifier contained in the trigger data.

(S112) The packets transmitted at steps S109 and 110 are received by router R3 on the way to their destinations. Router R3 saves them in its buffer if they do not match with the trigger condition received at step S103.

(S113) Router R3 determines whether any packet received at step S109 or S110 matches with the trigger condition received at step S103. If the condition is met, then router R3 advances to step S114.

(S114) Router R3 has been keeping pending packets in its buffer since step S112, some of which may match with the trigger condition given at step S103. Router R3 takes out of the buffer the packets subsequent to that match and transmits them to the receiving device.

(S115) After sending the buffered packets, router R3 simply forwards subsequent multicast packets (mc-data) received at step S110.

(S116) If the trigger condition received at step S101 is met, then router R2 stops the operation of step S105 (i.e., stops sending encapsulated packets).

FIG. 19 shows an example sequence where the terminal and network operate together to change multicast routes.

(S121) The transmitting device 10 transmits multicast packets (mc-data) to the initial multicast tree, giving each multicast packet a piece of information indicating the packet sequence.

(S122) The transmitting device 10 moves to the area of router R2, thus receiving a router advertisement of router R2.

(S123) The router advertisement causes the transmitting device 10 to replace its care-of address with CoA-R2.

(S124) The transmitting device 10 sends a location registration request to the network control server 20, together with trigger data.

(S125) The network control server 20 sends trigger data to router R2, thus specifying a trigger condition for route switching. The trigger data includes multicast control parameters, for use by router R2 to stop sending encapsulated packets.

(S126) The network control server 20 sends trigger data to router R1, thus specifying a trigger condition for removal of obsolete route information.

(S127) Besides saving the received multicast control parameters, router R1 sends the data to the multicast route.

(S128) The network control server 20 returns acknowledgment of the location registration back to the transmitting device 10.

(S129) The transmitting device 10 transmits packets to router R2.

(S130) Upon receipt of each packet, router R2 sends an encapsulated version of the received packet to router R1 on the initial route until it reaches the stop point specified by the multicast control parameters of step S121.

(S131) Router R2 also stores the received packets in its buffer.

(S132) Router R1 decapsulates packets received at step S130 for delivery over the initial route.

(S133) In response to the trigger data provided at step S127, router R3 applies to router R2 for entry to the new multicast tree.

(S134) Router R2 has been keeping the packets received at step S131 in its buffer. Upon receipt of the entry request from router R3, router R2 outputs those buffered packets to the new route.

(S135) After sending out the buffered data, router R2 simply forwards subsequent multicast packets (mc-data) transmitted at step S132.

(S136) Router R1 determines whether the packet sent at step S130 matches with the trigger condition received at step S126. If the condition is met, then router R1 removes the route specified by a relevant multicast identifier contained in the trigger data.

(S137) The packets transmitted at steps S134 and 135 are received by router R3 on the way to their destinations. Router R3 saves them in a buffer if they do not match with the trigger condition received at step S127.

(S138) Router R3 determines whether any packet received at step S134 or S135 matches with the trigger condition received at step S133. If the condition is met, then router R3 advances to step S139.

(S139) Router R3 has been keeping pending packets in its buffer since step S137, some of which may match with the trigger condition given at step S127.

Router R3 takes out of the buffer the packets subsequent to that match and transmits them to the receiving device.

(S140) After sending out the buffered packets, router R3 simply forwards subsequent multicast packets (mc-data) transmitted at step S135.

(S141) If the trigger condition received at step S125 is met, then router R2 stops the operation of step S130 (i.e., stops sending encapsulated packets).

Figure 20:
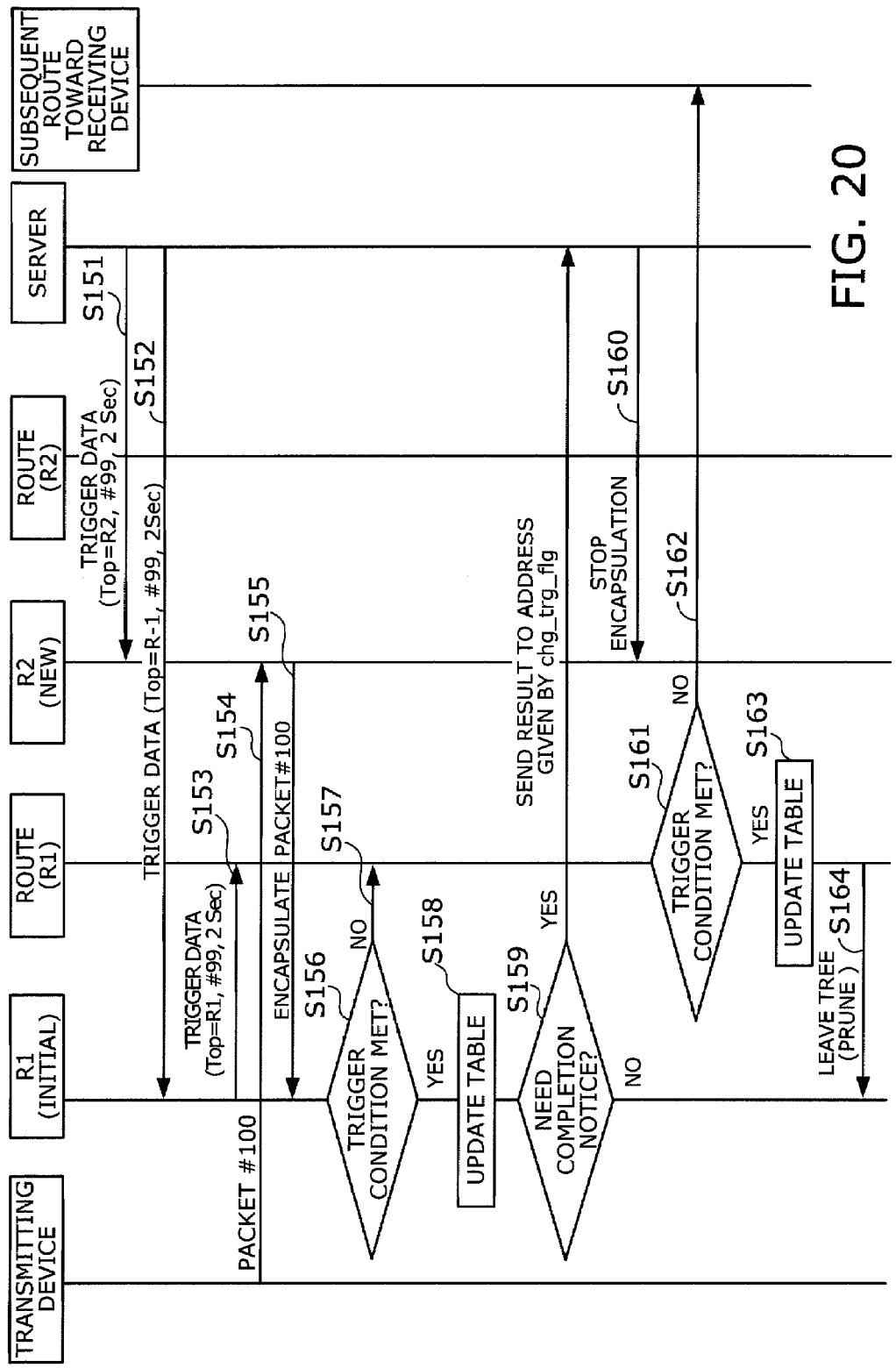
FIG. 20 shows an example of a process sequence on an initial route.

FIG. 20 shows an example of a process sequence on an initial route.

(S151) The network control server 20 sends trigger data to router R2 on a new route, including multicast control data appointing router R2 as a root point of new multicast route and specifying a sequence number of "99" (#99), and an update timer of two seconds.

(S152) The network control server 20 sends trigger data to router R1 on the initial route, including multicast control data appointing router R2 as a root point of new multicast route and specifying a sequence number of "99" (#99), and an update timer of two seconds.

(S153) The router R1 forwards the data received at step S152 to its own route.

(S154) The transmitting device 10 sends a multicast packet with a sequence number #100 to router R2.

(S155) Router R2 sends an encapsulated version of the received packet #100 to router R1 on the initial route.

(S156) Upon receipt of packet #100 sent at step S155, router R1 determines whether the trigger condition is met (i.e., the specified sequence number is detected or the specified timer has expired).

(S157) If the test result of step S156 is false, router R1 sends the multicast packet to the initial route, without updating its multicast table.

(S158) If the test result of step S156 is true, router R1 updates its multicast table. In the case where router R1 has no new route information, it simply deletes the obsolete multicast table.

(S159) If the trigger data includes an option of a switching completion notice, router R1 on the initial route sends the switching result information to a destination address specified as a value of chg_trg_flg in multicast control data.

(S160) In response to the switching result information of step S159, the network control server 20 commands router R2 to stop the operation of step S155 (i.e., stop sending encapsulated packets).

(S161) Other routers on the downstream of router R1 receives the packet sent at step S157. They determines whether the trigger condition is met (i.e., the specified sequence number is detected or the specified timer has expired).

(S162) If the test result of step S161 is false, the routers forward the multicast packet to the initial route, without updating their multicast table.

(S163) If the test result of step S161 is true, the routers update their multicast table. In the case where router they have no new route information, they simply delete the obsolete multicast table.

(S164) Routers leave the initial multicast tree.

Figure 21:
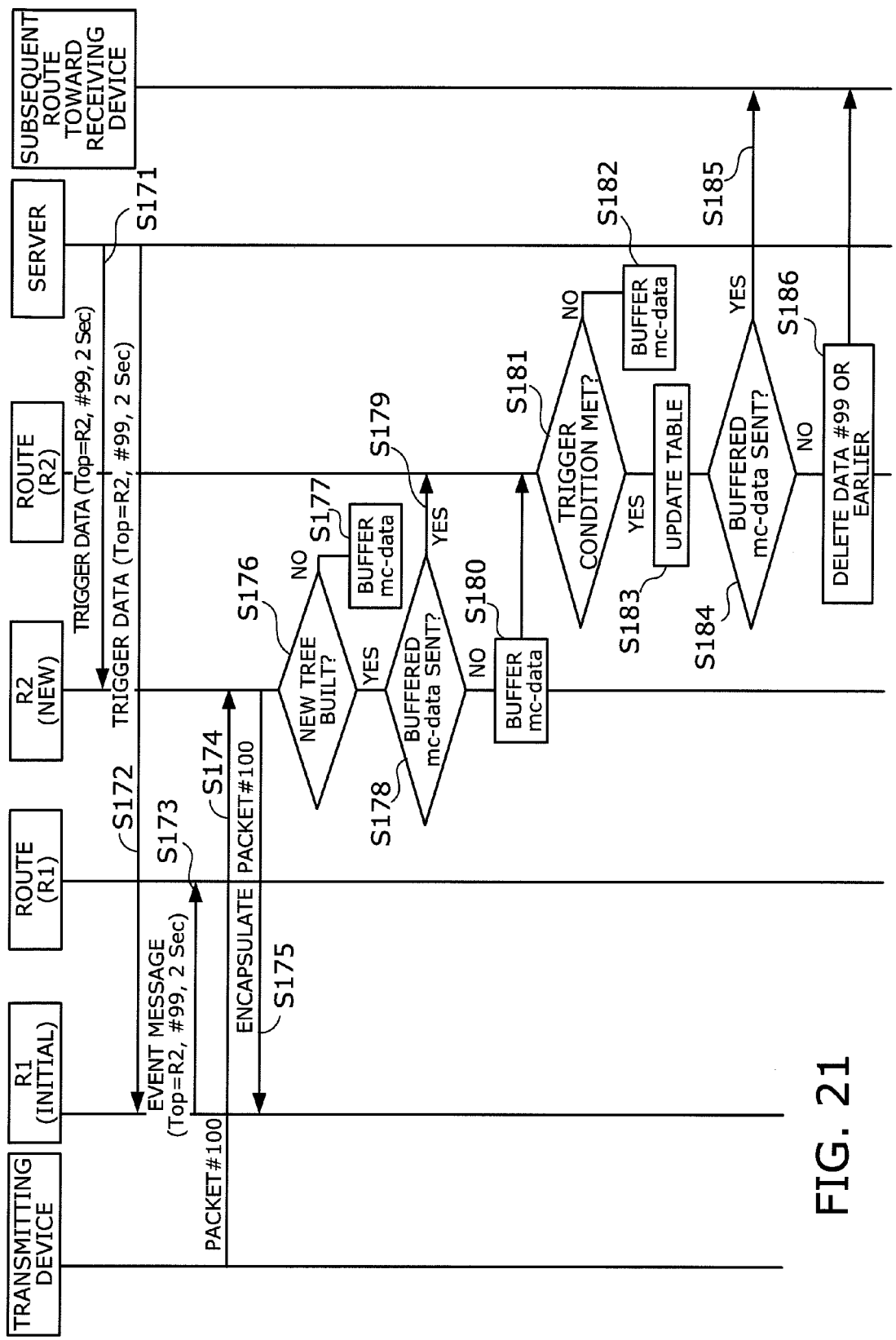
FIG. 21 shows an example of a process sequence on a new route.
Figure 22:
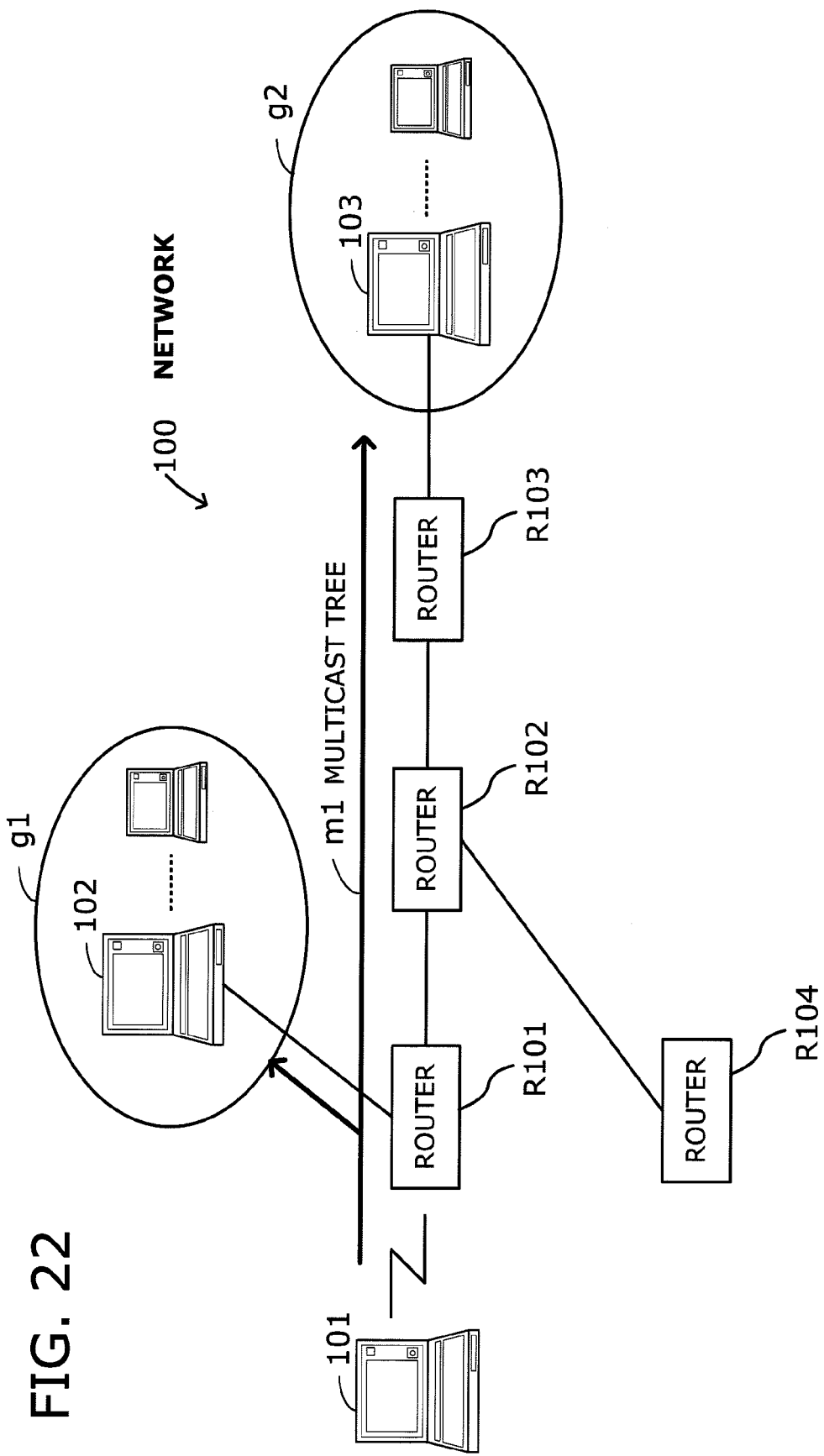
FIG. 22 shows an example of multicasting.
Figure 23:
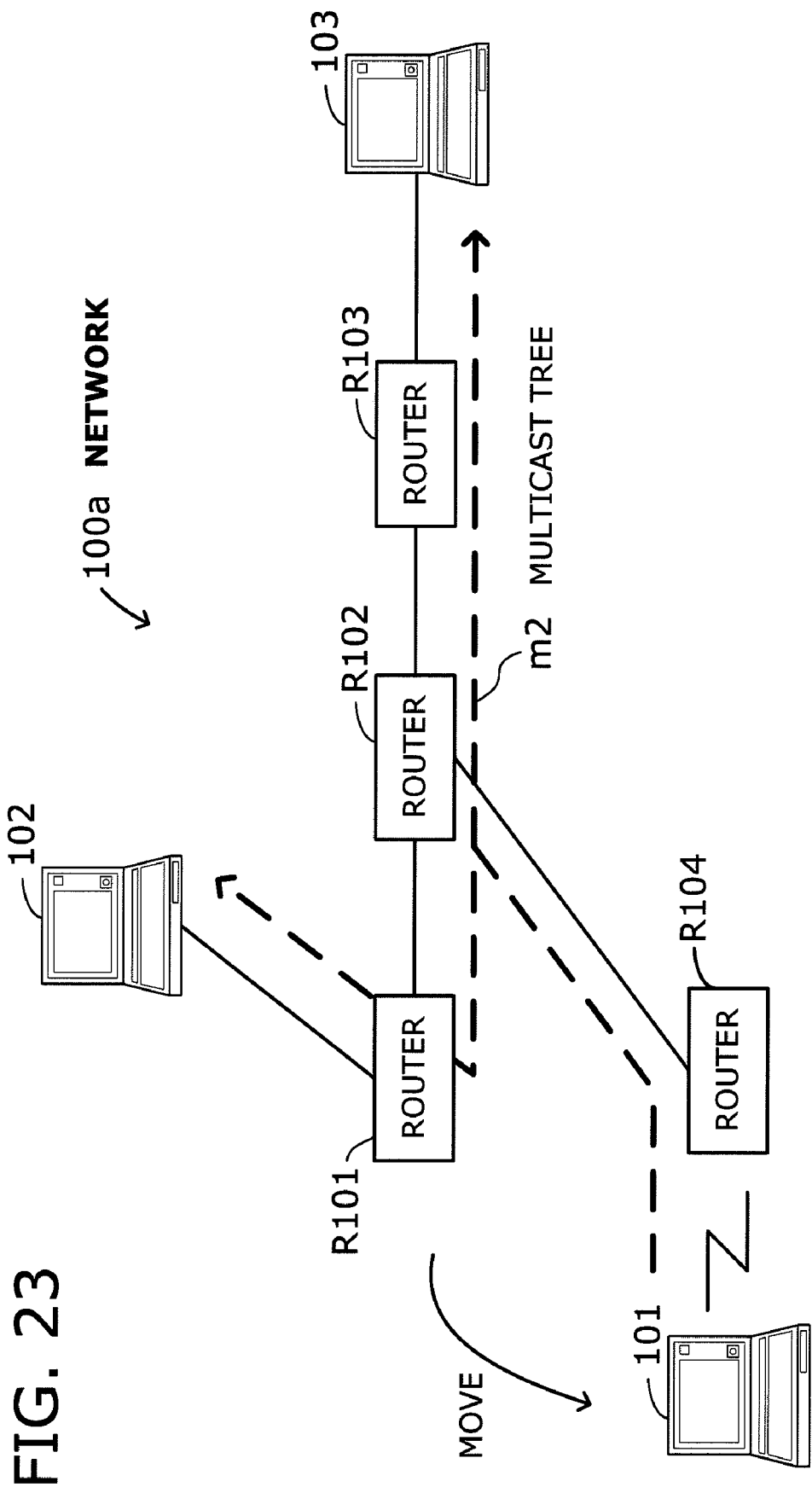
FIG. 23 shows another example of multicasting.

FIG. 21 shows an example of a process sequence on a new route.

(S171) The network control server 20 sends trigger data to router R2 on a new route, including multicast control data appointing router R2 as a root point of new multicast route and specifying a sequence number of "99" (#99), and an update timer of two seconds.

(S172) The network control server 20 sends trigger data to router R1 on the initial route, including multicast control data appointing router R2 as a root point of new multicast route and specifying a sequence number of "99" (#99), and an update timer of two seconds.

(S173) The router R1 forwards the data received at step S172 to its own route.

(S174) The transmitting device 10 sends a multicast packet with a sequence number #100 to router R2.

(S175) Router R2 sends an encapsulated version of the received packet #100 to router R1 on the initial route.

(S176) Router R2 determines whether a new tree has been built (i.e., whether it has received every necessary entry request for the specified multicast identifier).

(S177) If the result of step S176 is negative, router R2 enters multicast packets into a buffer.

(S178) If the result of step S176 is positive, then router R2 determines whether all buffered packets have been sent out. If they have, router R2 proceeds to step S179.

(S179) The router R2 forwards the data received at step S174 to its own route.

(S180) If step S178 finds remaining packets in the buffer, router R2 sends out the buffered packets of step S177 to its own route.

(S181) Upon receipt of packets, router R2 determines whether the trigger condition is met (i.e., the specified sequence number is detected or the specified timer has expired).

(S182) If the result of step S181 is false, the routers on the new route put each received packet into a buffer, without updating their multicast table.

(S183) If the result of step S181 is true, the routers update their multicast table.

(S184) Upon updating the multicast table, router R2 determines whether the buffer contains packets of step S182. If so, router R2 sends out those packets.

(S185) If the buffer contains no packets of step S182, then router R2 forwards the packets received at step S180 to their destinations.

(S186) Router R2 discards packets whose sequence number are smaller than 99.

As can be seen from the above discussion, the proposed multicast communications system reconfigures itself to handle a change in the multicast tree by deleting obsolete routes and building new routes. The system ensures reliable delivery of transmitted packets during the process of switching multicast transmission routes, thus maintaining the quality of multicast service.

CONCLUSION

To summarize the above discussion, the present invention provides a multicast communications system with a mechanism of updating multicast trees. A transmitting device that sends multicast packets produces trigger data when it has moved from an initial access point to a new access point. This trigger data includes a sequence number of a particular packet as a trigger condition that initiates a change from an initial multicast tree to a new multicast tree. A network control server sends the trigger data to both the initial and new access points. Packet routing devices maintain the initial multicast tree until they receive and forward a packet having the sequence number specified in the trigger data. After that, the packet routing devices replace the initial multicast tree with the new multicast tree. The proposed system synchronizes packet routing devices when they need to update the multicast tree. This feature prevents transmitted packets from being dropped or reversed before they reach their destinations, thus making the network more reliable and operable.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A multicast communications system for multicasting packets through a multicast tree on a network, the system comprising:

(a) a transmitting device capable of moving from a first access point to a second access point in the network, the transmitting device comprising:
a multicast transmitter that transmits packets while adding a sequence number to each packet to be multicast, and
a trigger data generator that produces trigger data and sends the trigger data together with a location registration request when the transmitting device has moved during a multicast session, the trigger data specifying a trigger condition that initiates a change from an initial multicast tree to a new multicast tree, the trigger data including the sequence number of a particular packet as the trigger condition;

(b) a network control server that handles the location registration request from the transmitting device and manages the multicast tree, the network control server comprising:
a trigger data distributor that receives the trigger data from the transmitting device and forwards the trigger data to the second access point where the transmitting device is visiting, as well as sending the trigger data in encapsulated form to the first access point to which the transmitting device has previously attached;

(c) a first packet routing device at the second access point, comprising:
a buffer that stores packets transmitted by the transmitting device during a period between reception of the trigger data and establishment of a new multicast tree and outputs the stored packets when the new multicast tree becomes ready;

(d) a second packet routing device at the first access point, comprising:
a decapsulator that decapsulates the encapsulated trigger data received and sends the decapsulated trigger data to the initial multicast tree; and (e) a third packet routing device on the initial multicast tree, comprising:
an update processor that finds the sequence number specified in the trigger data, maintains the initial multicast tree until a packet having the specified sequence number is received and forwarded, and replaces the initial multicast tree with the new multicast tree afterwards.

2. The multicast communications system according to claim 1, wherein:
the packets transmitted by the transmitting device contains a multicast destination address;
each packet routing device further comprises a multicast table for making a routing decision of packets according to a multicast tree, the multicast table including a predetermined key; and
each packet routing device selects a table entry relevant to a packet received from the transmitting device by searching the multicast table with a value calculated from the multicast destination address and the predetermined key, thereby forwarding the packet while keeping the multicast destination address intact.

3. A multicast communications system for multicasting packets through a multicast tree on a network, the system comprising:

(a) a transmitting device capable of moving from a first access point to a second access point in the network, the transmitting device comprising:
a multicast transmitter that transmits packets while adding a sequence number to each packet to be multicast,
a trigger data generator that produces trigger data when the transmitting device has moved during a multicast session, the trigger data specifying a trigger condition that initiates a change from an initial multicast tree to a new multicast tree, the trigger data including the sequence number of a particular packet as the trigger condition, and
a trigger data distributor that sends the produced trigger data to the second access point where the transmitting device is visiting, as well as sending the produced trigger data in encapsulated form to the first access point to which the transmitting device has previously attached; and (b) a network control server that handles location registration of the transmitting device;

(c) a first packet routing device at the second access point, comprising:
a buffer that stores packets transmitted by the transmitting device during a period between reception of the trigger data and establishment of a new multicast tree and outputs the stored packets when the new multicast tree becomes ready;

(d) a second packet routing device at the first access point, comprising:
a decapsulator that decapsulates the encapsulated trigger data received and sends the decapsulated trigger data to the initial multicast tree; and (e) a third packet routing device on the initial multicast tree, comprising:
an update processor that finds the sequence number specified in the trigger data, maintains the initial multicast tree until a packet having the specified sequence number is received and forwarded, and replaces the initial multicast tree with the new multicast tree afterwards.

4. The multicast communications system according to claim 3, wherein:
the packets transmitted by the transmitting device contains a multicast destination address;
each packet routing device further comprises a multicast table for making a routing decision of packets according to a multicast tree, the multicast table including a predetermined key; and each packet routing device selects a table entry relevant to a packet received from the transmitting device by searching the multicast table with a value calculated from the multicast destination address and the predetermined key, thereby forwarding the packet while keeping the multicast destination address intact.

5. A multicast communications system for multicasting packets through a multicast tree on a network, the system comprising:

(a) a transmitting device comprising:
a multicast transmitter that transmits packets while adding a sequence number to each packet to be multicast;

(b) a network control server comprising:
a command transmitter transmitting a pause-before-update command initiating a change from an initial multicast tree to a new multicast tree, as well as an anchor appointment command appointing an anchor that is positioned immediately below a root of the new multicast tree;

(c) a first routing device at an access point of the network to which the transmitting device attaches, the access routing device comprising:
an access routing controller that receives and forwards the pause-before-update command from the network control server to the initial multicast tree, produces trigger data including the sequence number of a particular packet as a trigger condition for switching to the new multicast tree, sends out the produced trigger data to the initial multicast tree, and holds outgoing packets of the transmitting device temporarily until an entry request is received in response to the trigger data that is sent;

(d) a second routing device next to the first routing device on the new multicast tree, comprising:
an anchor routing controller that, upon recognition of the second routing device as an anchor router from the anchor appointment command received from the network control server, receives and forwards an entry request from the new multicast tree to the first routing device, and receives and forwards packets from the first routing device to the new multicast tree; and (e) a third routing device, comprising:
an update processor that sends the entry request toward the first routing device in response to the pause-before-update command forwarded from the first routing device, and keeps the current multicast tree active until a packet with the sequence number specified in the trigger data is received and forwarded.

6. The multicast communications system according to claim 5, wherein:
the packets transmitted by the transmitting device contains a multicast destination address;
each packet routing device further comprises a multicast table for making a routing decision of packets according to a multicast tree;
the multicast table including a predetermined key; and
each packet routing device selects a table entry relevant to a packet received from the transmitting device by searching the multicast table with a value calculated from the multicast destination address and the predetermined key, thereby forwarding the packet while keeping the multicast destination address intact.

7. A multicast communications system for multicasting packets through a multicast tree on a network, the system comprising:

(a) a transmitting device capable of moving from a first access point to a second access point in the network, the transmitting device comprising:
a multicast transmitter that transmits packets while adding a sequence number to each packet to be multicast; and
a trigger/address sender that produces trigger data and transmits the produced trigger data, together with an address of the second access point that the transmitting device is going to visit during a multicast session, the trigger data specifying a trigger condition that initiates a change from an initial multicast tree to a new multicast tree, the trigger data including the sequence number of a particular packet as the trigger condition;

(b) a network control server that handles location registration of the transmitting device and manages the multicast tree, the network control server comprising:
a trigger data distributor that receives the trigger data from the transmitting device and forwards the trigger data to the second access point where the transmitting device is visiting, as well as sending the trigger data in encapsulated form to the packet routing device at the first access point to which the transmitting device has previously attached;

(c) a first packet routing device at the second access point and at least one neighboring packet routing device thereof on a new multicast tree, the first packet routing device comprising:
an entry request handler that begins to wait for a multicast service entry request from the neighboring packet routing device in response to the trigger data from the network control server and upon receipt thereof, begins to route packets from the transmitting device to the new multicast tree;

(d) a second packet routing device at the first access point, comprising:
a decapsulator that decapsulates the encapsulated trigger data received and sends the decapsulated trigger data to the initial multicast tree; and (e) a third packet routing device on the initial multicast tree, comprising:
an update processor that finds the sequence number specified in the trigger data, maintains the initial multicast tree until a packet having the specified sequence number is received and forwarded, and replaces the initial multicast tree with the new multicast tree afterwards.

8. The multicast communications system according to claim 7, wherein:
the packets transmitted by the transmitting device contains a multicast destination address;
each packet routing device further comprises a multicast table for making a routing decision of packets according to a multicast tree;
the multicast table including a predetermined key; and
each packet routing device selects a table entry relevant to a packet received from the transmitting device by searching the multicast table with a value calculated from the multicast destination address and the predetermined key, thereby forwarding the packet while keeping the multicast destination address intact.

9. A multicast communications system for multicasting packets through a multicast tree on a network, the system comprising:

(a) a transmitting device capable of moving from a first access point to a second access point in the network, the transmitting device comprising:
a multicast transmitter that transmits packets while adding a sequence number to each packet to be multicast; and
a multicast control data generator that produces multicast control data for building and controlling multicast trees and sends the multicast control data together with a location registration request when the transmitting device has moved during a multicast session;

(b) a network control server that handles the location registration request from the transmitting device and manages multicast trees, the network control server comprising:

a multicast control data distributor that receives the multicast control data from the transmitting device and forwards the multicast control data to the second access point where the transmitting device is visiting, as well as sending the multicast control data in encapsulated form to the first access point to which the transmitting device has previously attached;

(c) a first packet routing device at the second access point, comprising:

a buffer that stores packets transmitted by the transmitting device during a period between reception of the multicast control data and establishment of a new multicast tree and outputs the stored packets when the new multicast tree becomes ready;

(d) a second packet routing device at the first access point, comprising:

a decapsulator that decapsulates the encapsulated multicast control data received from the network control server and sends the decapsulated multicast control data to an initial multicast tree; and (e) a third packet routing device on the initial multicast tree, comprising:

an update processor that replaces the initial multicast tree with the new multicast tree according to the multicast control data.

10. The multicast communications system according to claim 9, wherein:

the packets transmitted by the transmitting device contains a multicast destination address;

each packet routing device further comprises a multicast table for making a routing decision of packets according to a multicast tree;

the multicast table including a predetermined key; and each packet routing device selects a table entry relevant to a packet received from the transmitting device by searching the multicast table with a value calculated from the multicast destination address and the predetermined key, thereby forwarding the packet while keeping the multicast destination address intact.

11. The multicast communications system according to claim 9, wherein:

(a) the multicast control data generator produces at least one of prioritized parameters including:

a pause command requesting to hold a current multicast tree as is until notified of a trigger event that permits updating of the multicast tree, a sequence number of a particular packet to be forwarded, producing a trigger event for updating a multicast tree, a sequence number of a particular packet to be forwarded, producing a trigger event for reverting a new multicast tree back to a previous multicast tree, a timer for updating a multicast tree, a timer for reverting a new multicast tree back to a previous multicast tree, a timer for enabling a new multicast tree connection, and a route explicitly specified as being ineligible for multicasting; and (b) the update processor updates the multicast tree, based on the parameters with higher priorities.

12. A multicast communications system for multicasting packets through a multicast tree on a network, the system comprising:

(a) a transmitting device capable of moving from a first access point to a second access point in the network, the transmitting device comprising:

a multicast transmitter that transmits packets while adding a sequence number to each packet to be multicast;

a multicast control data generator that produces multicast control data for building and controlling multicast trees and sends the multicast control data together with a location registration request when the transmitting device has moved during a multicast session; and a multicast control data distributor that sends the produced multicast control data to the second access point where the transmitting device is visiting, as well as sending the produced multicast control data in encapsulated form to the first access point to which the transmitting device has previously attached;

(b) a network control server that handles location registration of the transmitting device;

(c) a first packet routing device at the second access point, comprising:

a buffer that stores packets transmitted by the transmitting device during a period between reception of the multicast control data and establishment of a new multicast tree and outputs the stored packets when the new multicast tree becomes ready;

(d) a second packet routing device at the first access point, comprising:

a decapsulator that decapsulates the encapsulated multicast control data received from the network control server and sends the decapsulated multicast control data to an initial multicast tree; and (e) a third packet routing device on the initial multicast tree, comprising:

an update processor that replaces the initial multicast tree with the new multicast tree according to the multicast control data.

13. The multicast communications system according to claim 12, wherein:

the packets transmitted by the transmitting device contains a multicast destination address;

each packet routing device further comprises a multicast table for making a routing decision of packets according to a multicast tree;

the multicast table including a predetermined key; and each packet routing device selects a table entry relevant to a packet received from the transmitting device by searching the multicast table with a value calculated from the multicast destination address and the predetermined key, thereby forwarding the packet while keeping the multicast destination address intact.

14. The multicast communications system according to claim 12, wherein:

(a) the multicast control data generator produces at least one of prioritized parameters including:

a pause command requesting to hold a current multicast tree as is until notified of a trigger event that permits updating of the multicast tree, a sequence number of a particular packet to be forwarded, producing a trigger event for updating a multicast tree, a sequence number of a particular packet to be forwarded, producing a trigger event for reverting a new multicast tree back to a previous multicast tree, a timer for updating a multicast tree, a timer for reverting a new multicast tree back to a previous multicast tree,
a timer for enabling a new multicast tree connection, and
a route explicitly specified as being ineligible for multicasting; and
(b) the update processor updates the multicast tree, based on the parameters with higher priorities.

15. A multicast communications system for multicasting packets through a multicast tree on a network, the system comprising:
(a) a transmitting device capable of moving from a first access point to a second access point in the network, the transmitting device comprising:
a multicast transmitter that transmits packets while adding a sequence number to each packet to be multicast, and
a multicast control data/address sender that produces multicast control data for building and controlling multicast trees and transmits beforehand the produced multicast control data, together with an address of the second access point that the transmitting device is going to visit during a multicast session;
(b) a network control server that handles location registration of the transmitting device and manages multicast trees, the network control server comprising:
a multicast control data distributor that receives the multicast control data from the transmitting device and forwards the multicast control data to the second access point where the transmitting device is visiting, as well as sending the multicast control data in encapsulated form to the first access point to which the transmitting device has previously attached;
(c) a first packet routing device at the second access point and at least one neighboring packet routing device thereof on a new multicast tree, the first packet routing device comprising:
an entry request handler that begins to wait for a multicast service entry request from the neighboring packet routing device in response to the multicast control data from the network control server and upon receipt thereof, begins to route packets from the transmitting device to the new multicast tree;
(d) a second packet routing device at the first access point, comprising:
a decapsulator that decapsulates the encapsulated multicast control data received from the transmitting device and sends the decapsulated multicast control data to an initial multicast tree; and
(e) a third packet routing device on the initial multicast tree, comprising:
an update processor that replaces the initial multicast tree with the new multicast tree according to the multicast control data.

16. The multicast communications system according to claim 15, wherein:
the packets transmitted by the transmitting device contains a multicast destination address;
each packet routing device further comprises a multicast table for making a routing decision of packets according to a multicast tree;
the multicast table including a predetermined key; and
each packet routing device selects a table entry relevant to a packet received from the transmitting device by searching the multicast table with a value calculated from the multicast destination address and the predetermined key, thereby forwarding the packet while keeping the multicast destination address intact.

17. The multicast communications system according to claim 15, wherein:
(a) the multicast control data generator produces at least one of prioritized parameters including:
a pause command requesting to hold a current multicast tree as is until notified of a trigger event that permits updating of the multicast tree,
a sequence number of a particular packet to be forwarded, producing a trigger event for updating a multicast tree,
a sequence number of a particular packet to be forwarded, producing a trigger event for reverting a new multicast tree back to a previous multicast tree,
a timer for updating a multicast tree,
a timer for reverting a new multicast tree back to a previous multicast tree,
a timer for enabling a new multicast tree connection, and
a route explicitly specified as being ineligible for multicasting; and
(b) the update processor updates the multicast tree, based on the parameters with higher priorities.

18. A method of multicasting packets over a multicast tree on a network, the method comprising:
transmitting multicast packets from a transmitting device to an access point of the network, while adding a sequence number to each multicast packet;
sending trigger data to an initial multicast tree, the trigger data specifying a trigger condition that initiates a change from the initial multicast tree to a new multicast tree;
preparing the new multicast tree at each routing device that has received the trigger data, depending on a current state of the initial multicast tree; and
switching from the initial multicast tree to the new multicast tree at each routing device upon receipt of a multicast packet that meets the trigger condition specified by the trigger data.

19. The method according to claim 18, wherein:
said sending of the trigger data is performed upon detection of a fact that the transmitting device has moved to another access point of the network; and
the trigger data includes, as a trigger condition, a sequence number of a last multicast packet that the transmitting device has sent to the previous access point.

20. The method according to claim 18, wherein said sending of the trigger data is performed upon detection of a fact that the transmitting device has moved to another access point of the network.

21. The method according to claim 18, wherein the trigger data to be sent by the sending step includes a sequence number of a particular multicast packet as a trigger condition,
the method further comprising:
allowing the initial multicast tree to continue transporting multicast packets including the particular multicast packet having the sequence number specified in the trigger data even after the transmitting device has moved to another access point of the network;
allowing the transmitting device to transmit new multicast packets to the new multicast tree after transmitting device has transmitted the particular multicast packet having the specified sequence number;
holding the new multicast packets coming from the new multicast tree in a buffer until the particular multicast packet having the specified sequence number is received from the initial multicast tree; and
releasing the new multicast packets from the buffer to the new multicast tree by replacing the initial multicast tree with the new multicast tree upon forwarding the received particular multicast packet.

22. The method according to claim 18, wherein said preparing of a new multicast tree is performed using the initial multicast tree after the transmitting device has move to the new access point of the network.

23. The method according to claim 18, further comprising sending a pause command for taking a pause before executing the change to the new multicast tree, wherein said sending of trigger data is performed separately from said sending of a pause command.

24. The method according to claim 23, wherein:
   (a) the trigger data is multicast control data specifying an event that triggers a change to multicast trees;
   (b) the multicast control data comprises at least one of prioritized parameters including:
   a pause command requesting to hold a current multicast tree as is until notified of a trigger event that permits updating of the multicast tree,
   a sequence number of a particular packet to be forwarded, producing a trigger event for updating a multicast tree,
   a sequence number of a particular packet to be forwarded, producing a trigger event for reverting a new multicast tree back to a previous multicast tree,
   a timer for updating a multicast tree,
   a timer for reverting a new multicast tree back to a previous multicast tree,
   a timer for enabling a new multicast tree connection, and
   a route explicitly specified as being ineligible for multicasting; and
   (c) said switching to the new multicast tree is performed based on the parameters with higher priorities.

25. The method according to claim 18, further comprising:

creating a new multicast table defining how to route multicast packets having a new multicast identifier, the new multicast table comprising a difference code representing a difference between the new multicast identifier and an initial multicast identifier corresponding to the initial multicast tree; and routing multicast packets having the initial multicast identifier by consulting the new multicast table using the difference code and the initial multicast identifier.

* * * * *